(12) United States Patent
Stephen et al.

(10) Patent No.: US 8,229,854 B2
(45) Date of Patent: Jul. 24, 2012

(54) TRANSACTION PROCESSING

(75) Inventors: Kavanagh Stephen, Dublin (IE); Conor Clarke, Dublin (IE); Kleron Guilfoyle, Dublin (IE); Patrick Brosnan, Dublin (IE)

(73) Assignee: Orbiscom Limited, Dublin (IE)

( * ) Notice: Subject to any disclaimer, the term of this patent is extended or adjusted under 35 U.S.C. 154(b) by 59 days.

(21) Appl. No.: 12/461,289

(22) Filed: Aug. 6, 2009

(65) Prior Publication Data

US 2010/0017328 A1 Jan. 21, 2010

Related U.S. Application Data

(63) Continuation of application No. 10/735,642, which is a continuation of application No. PCT/IE02/00093, filed on Jun. 27, 2002, now abandoned.

(30) Foreign Application Priority Data

Jun. 27, 2001 (IE) .................................... 2001/0594

(51) Int. Cl.
*G06Q 40/00* (2006.01)
*G06F 7/00* (2006.01)
*G06F 17/30* (2006.01)
*G06F 15/16* (2006.01)
*G06K 5/00* (2006.01)

(52) U.S. Cl. ............. 705/44; 705/39; 705/40; 705/42; 705/43; 707/779; 707/790; 235/379; 235/380; 709/200; 709/217; 709/218; 709/227

(58) Field of Classification Search .............. 705/39, 705/42, 44; 707/694, 703, 779, 792, 803, 707/805; 235/379, 380; 709/200, 217, 218, 709/227

See application file for complete search history.

(56) References Cited

U.S. PATENT DOCUMENTS

| 4,408,203 A | 10/1983 | Campbell ..................... 705/71 |
| 4,874,932 A | 10/1989 | Kimizu |
| 5,208,446 A * | 5/1993 | Martinez ..................... 235/380 |
| 5,388,148 A | 2/1995 | Seiderman ................. 455/404.1 |
| 5,903,830 A | 5/1999 | Joao et al. |

(Continued)

FOREIGN PATENT DOCUMENTS

EP 0745961 A 12/1996

(Continued)

OTHER PUBLICATIONS

Business Editors & Telecommunications Writers; "Deversifd Transactns: Diversified Transactions debuts Translink to boost bank credit card profits"; May 29, 1991; p. 1.*

(Continued)

*Primary Examiner* — Ella Colbert
(74) *Attorney, Agent, or Firm* — Buchanan Ingersoll & Rooney PC

(57) ABSTRACT

A transaction processing system for the real time authorization of payment transactions, The system comprises a verification system (4) connected to an issuer card management system (3). A cardholder can access the system via an interface (2) which can be for example the Internet, a wireless device, telephone, or a branch visit. The interface allows the cardholder to input rules governing how their credit card transactions are to be authorized. When the cardholder initiates a purchase transaction with their credit card, an authorization request is passed from the card network to the verification system which executes the rules created by the cardholder in order to approve or deny the transaction.

27 Claims, 20 Drawing Sheets

U.S. PATENT DOCUMENTS

| | | | |
|---|---|---|---|
| 5,963,925 A | 10/1999 | Kolling et al. | 705/40 |
| 6,029,154 A * | 2/2000 | Pettitt | 705/44 |
| 7,263,506 B2 | 8/2007 | Lee et al. | 705/38 |
| 7,403,922 B1 * | 7/2008 | Lewis et al. | 705/38 |
| 2002/0143634 A1 | 10/2002 | Kumar et al. | 705/18 |
| 2002/0160771 A1 | 10/2002 | Massie et al. | 455/426 |
| 2003/0158759 A1 | 8/2003 | Kannenberg | 705/4 |

FOREIGN PATENT DOCUMENTS

| | | |
|---|---|---|
| EP | 0813173 A | 12/1997 |
| EP | 1265200 A1 | 12/2002 |
| WO | 0049586 | 8/2000 |
| WO | 0063855 A | 10/2000 |

OTHER PUBLICATIONS

Business Editors/ Computer Writers; "NCR Corp2: NCR System 3600 is Platform for Enterprise-Wide Computing: Massively Parallel System Ideal for Decision Support and Transaction Processing, Exley says"; May 13, 1991; pp. 1-2.*

* cited by examiner

Template #1

| | Cond 1 | Cond 2 | Cond 3 | Cond 4 | Cond 5 | Cond 6 | Cond 7 | Cond 8 | Cond 9 | Cond 10 | Action | Notify |
|---|---|---|---|---|---|---|---|---|---|---|---|---|
| | Field 32 | Field 32 | Field 32 | x | x | x | x | x | x | x | Decline | SMS |
| | Equals | Equals | Equals | x | x | x | x | x | x | x | Back | Email |
| | Africa | Asia | Australia | x | x | x | x | x | x | x | Response Code 2 | |
| | OR | OR | x | x | x | x | x | x | x | x | | |

Template #2

| | Cond 1 | Cond 2 | Cond 3 | Cond 4 | Cond 5 | Cond 6 | Cond 7 | Cond 8 | Cond 9 | Cond 10 | Action | Notify |
|---|---|---|---|---|---|---|---|---|---|---|---|---|
| | Field41.2 | Field41.2 | x | x | x | x | x | x | x | x | Decline | x |
| | Equals | Equals | x | x | x | x | x | x | x | x | Back | x |
| | 20 | 20 | x | x | x | x | x | x | x | x | Response Code 2 | |
| | AND | x | x | x | x | x | x | x | x | x | | |

Rules of CardHolder #1

| Card Number | Template | Parameter 1 | Parameter 2 | SMS address | Email address | Sequence |
|---|---|---|---|---|---|---|
| 1234123412341234 | 1 | x | x | | joe.bloggs@aol.com | 1 |
| 1234123412341234 | 2 | x | x | 087 2337868 | x | 2 |

Rules of CardHolder #2

| Card Number | Template | Parameter 1 | Parameter 2 | SMS address | Email address | Sequence |
|---|---|---|---|---|---|---|
| 999 999 9999 999 999 | 1 | x | x | 087 2337868 | joebloggs@aol.com | 1 |

Fig. 8

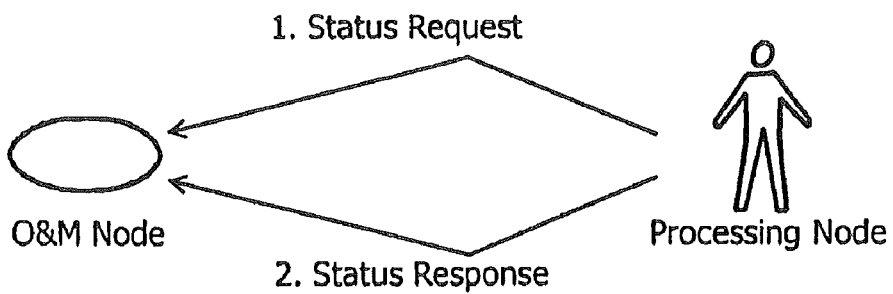
Fig. 25
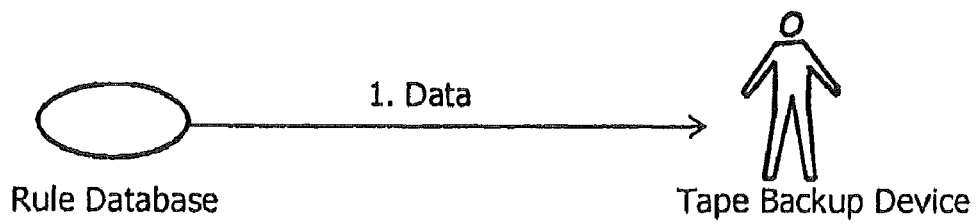
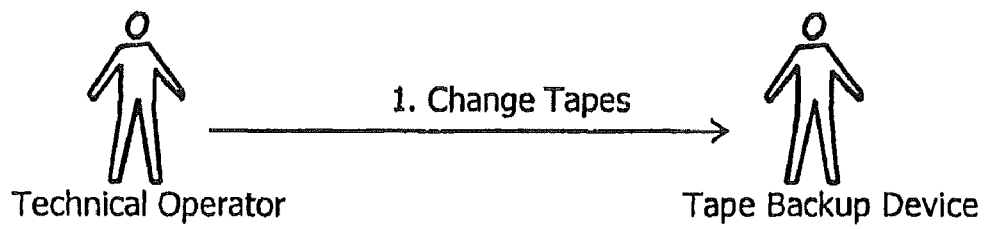
Fig. 26
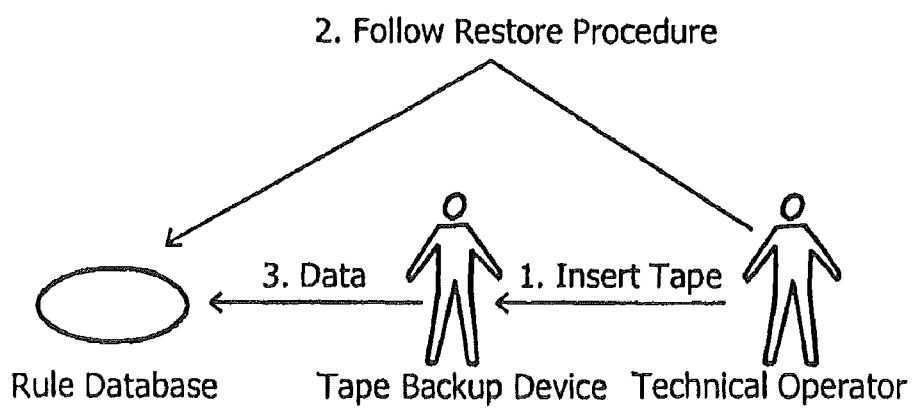
Fig. 27

ABC Online Banking

Login/Logout

Card List

>Edit Card Rules

---

Card operated by | Cantwell, Gerard |

Company Notifications:
- ☐ Transactions Declined — eMail Address — accounts@primus.com
- ☐ Transactions Approved — eMail Address — accounts@primus.com

CardHolder Notifications:
- ☐ Transactions Declined — eMail Address — cantwellg@primus.com
- ☐ Transactions Declined — SMS Number — 0872229843
- ☐ Transactions Approved — eMail Address
- ☐ Transactions Approved — SMS Number

Per Transaction Limit
[EUR 500.00 ▼]

Allow Currencies
- ☐ US Dollar     ☐ Sterling
- ☐ Euro          ☐ Other

Time Limit on Transactions: (local time)
[8:00am ▼] to [8:00pm ▼]

Allow Transactions with vendors in the following areas:
- ☐ Africa — Set Individual Countries
- ☐ Asia
- ☐ Australia (incl New Zealand) — Set Individual Countries
- ☐ Europe — Set Individual Countries
- ☐ South America — Set Individual Countries
- ☐ North America — Set Individual Countries

Allow the following types of transactions
- ☐ At Counter
- ☐ Internet
- ☐ Telephone
- ☐ Mail Order

Allow cash withdrawals from ATM machine
- ☐ Yes
- ☐ No

Fig. 30

TRANSACTION PROCESSING

CROSS-REFERENCE TO RELATED APPLICATIONS

This is a continuation of U.S. application Ser. No. 10/735,642, filed Dec. 16, 2003, which is a continuation of PCT/IE02/00093, filed Jun. 27, 2002 and published in English, both of which are incorporated herein by reference in their entireties.

BACKGROUND OF THE INVENTION

1. Field of the Invention

The invention relates to real time authorization of transactions using non-cash payment instruments such as credit cards and debit cards.

2. Related Art

While there has been much discussion in recent years concerning card-not-present (and particularly Internet shopping) fraud, in fact the bulk of credit card fraud arises from card-present transactions. For example, card "skimming" often results in a fraudulent card being produced and used, possibly in a different country from where the skimming occurred. Another example is mail interception, in which cards are stolen from the postal system as they are en route to the customer.

While the losses arising from fraud are very considerable, efforts to date at providing new systems to reduce fraud have met with only limited success. In one approach marketed by the company Orbiscom™ a "disposable" card number is issued to which limited use conditions are applied. This approach appears to be of benefit for Internet transactions, however it is generally believed to be of little benefit for card present transactions.

In another approach, "neural intelligence" is used by the issuer to monitor proposed transactions and to block those which do not appear to fit a usage pattern for the cardholders. These systems monitor patterns of usage and on the basis of this monitoring, determine when usage is out of the ordinary. While this appears to be a very helpful approach, it suffers from practical problems. For example, a cardholder may find to his or her embarrassment and inconvenience that he or she can not use a card when on holiday in a foreign country. The overall impression the cardholder has is that he or she is not in control and does not understand how his or her transactions are controlled.

The invention is therefore directed towards providing a system and method for real time processing of transactions to reduce overall fraud. Another object is to help ensure that cardholders are more in control of how their cards are used and that they are informed of what is happening.

SUMMARY OF THE INVENTION

According to the invention, there is provided a transaction processing system comprising an interface for receiving authorization requests, an interface for transmitting authorization outputs, and a processing means comprising means for determining from authorization request data if the system output should be positive for negative, characterized in that the processing means comprises:

a setup means comprising means for storing transaction conditions associated with particular customers, and
authorization means for dynamically retrieving a transaction condition associated with the customer of each authorization request on a per-transaction basis and for applying said conditions to the authorization request.

In one embodiment the setup means comprises an interface comprising means for allowing each customer to define said conditions.

In one embodiment said interface comprises a Web server.

In another embodiment the setup means comprises means for storing predefined template conditions, and for allowing a customer to select predefined template conditions for his or her card.

In a further embodiment the setup means comprises a fraud manager interface comprising means for allowing a fraud manager with access control to define said template conditions.

In one embodiment the predefined template condition comprises specific placeholders for conditions, values and logical operators.

In one embodiment the setup means comprises input means for allowing a customer to input customer specified parameters to the predefined template conditions.

In another embodiment each template comprises an associated action which is the action to be taken if, upon evaluation, the template condition evaluates to "true".

In a further embodiment at least some of the conditions are in the form of program code rules.

In one embodiment the setup means comprises means for maintaining a rule database.

In one embodiment the rule database comprises means for storing rules in a format which is indexed on a particular customer or customer card number.

In another embodiment said rules comprise system, product and customer rules.

In one embodiment said rules are stored in a format which does not require parsing of logical string-based expressions for processing.

In one embodiment the authorization means comprises means for automatically transmitting a notification to a customer under control of the conditions.

In another embodiment the authorization means comprises means for receiving confirmation of authorization from a customer in response to a notification.

In a further embodiment the authorization means comprises means for successively applying system-level, card product-level, and the customer conditions upon receipt of an authorization request.

In another embodiment the authorization request interface comprises a network interface for interfacing with a card payment network.

In one embodiment the authorization request interface comprises a network interface for interfacing with an issuer front end system.

In one embodiment the output interface further comprises a card management system interface means for interfacing with an issuer card management system.

In one embodiment the network interface comprises means for communicating over Transfer Control Protocol/Internet Protocol ("TCP/IP"), X.25, Serial, Modem, Systems Network Architecture ("SNA") or any other communication format.

In a further embodiment the network interface comprises for converting received messages into a general standard data format.

In another embodiment the network interface comprises a communication header module for converting received messages into a standardized data sequence of bytes.

In one embodiment the card management system interface comprises a protocol header module comprising means for converting a standardized sequence of bytes received from the network interface into an internal format for processing.

In another embodiment the card management system interface comprises a protocol header module comprising means for converting a standardized sequence of bytes received from a communications header module into an internal format for processing.

In a further embodiment the communication header and the protocol header modules comprise means for sequentially checking for, receiving, converting and routing messages and data.

In one embodiment the communication header and protocol header modules comprise means for routing transaction requests and responses between the card payment network and card management system.

In one embodiment the authorization means comprises means for updating the rules database in real time.

In another embodiment the authorization means comprises means for automatically transmitting a notification to a fraud manager if a possible fraud is detected.

In a further embodiment the setup means comprises means for automatically transmitting a notification to a customer if a possible fraud is detected.

In one embodiment the authorization means comprises means for automatically transmitting a notification to a customer if an authorization request is rejected.

In another embodiment the authorization means comprises means for automatically transmitting a notification to a customer if a request is authorized, allowing a customer to maintain a local log of authorized requests.

In a further embodiment the setup means comprises means for controlling customer activation of a card.

In one embodiment said controlling means comprises an on-line banking interface.

In another embodiment said controlling means comprises an Automated Teller Machine ("ATM") interface.

In a further embodiment the authorization means comprises means for receiving a cardholder request that a card be deactivated.

In one embodiment said means comprises means for receiving a Short Message Service ("SMS") from a cardholder.

According to another aspect of the invention, there is provided A transaction processing method carried by a verification system, and comprising the steps of:
  (i) receiving a transaction condition associated with a customer;
  (ii) writing said condition to a condition database also storing conditions associated with other customers;
  (iii) receiving a transaction authorization request from a transaction network;
  (iv) processing said received authorization request by dynamically retrieving a condition associated with the customer of the authorization request on a per transaction basis;
  (v) applying said condition and determining from the authorization request data if the requested transaction should be approved or denied.

BRIEF DESCRIPTION OF THE DRAWINGS

The invention will be more clearly understood from the following description of some embodiments thereof, given by way of example only with reference to the accompanying drawings in which:

FIG. 8 is a diagram illustrating a database object containing templates and cardholder rules;

FIGS. 16 to 27 are diagrams showing interaction between people of various roles and systems of the invention; and FIGS. 28, 29, and 30 are sample screen shots for system displays.

DETAILED DESCRIPTION OF THE PREFERRED EMBODIMENTS

Figure 1:
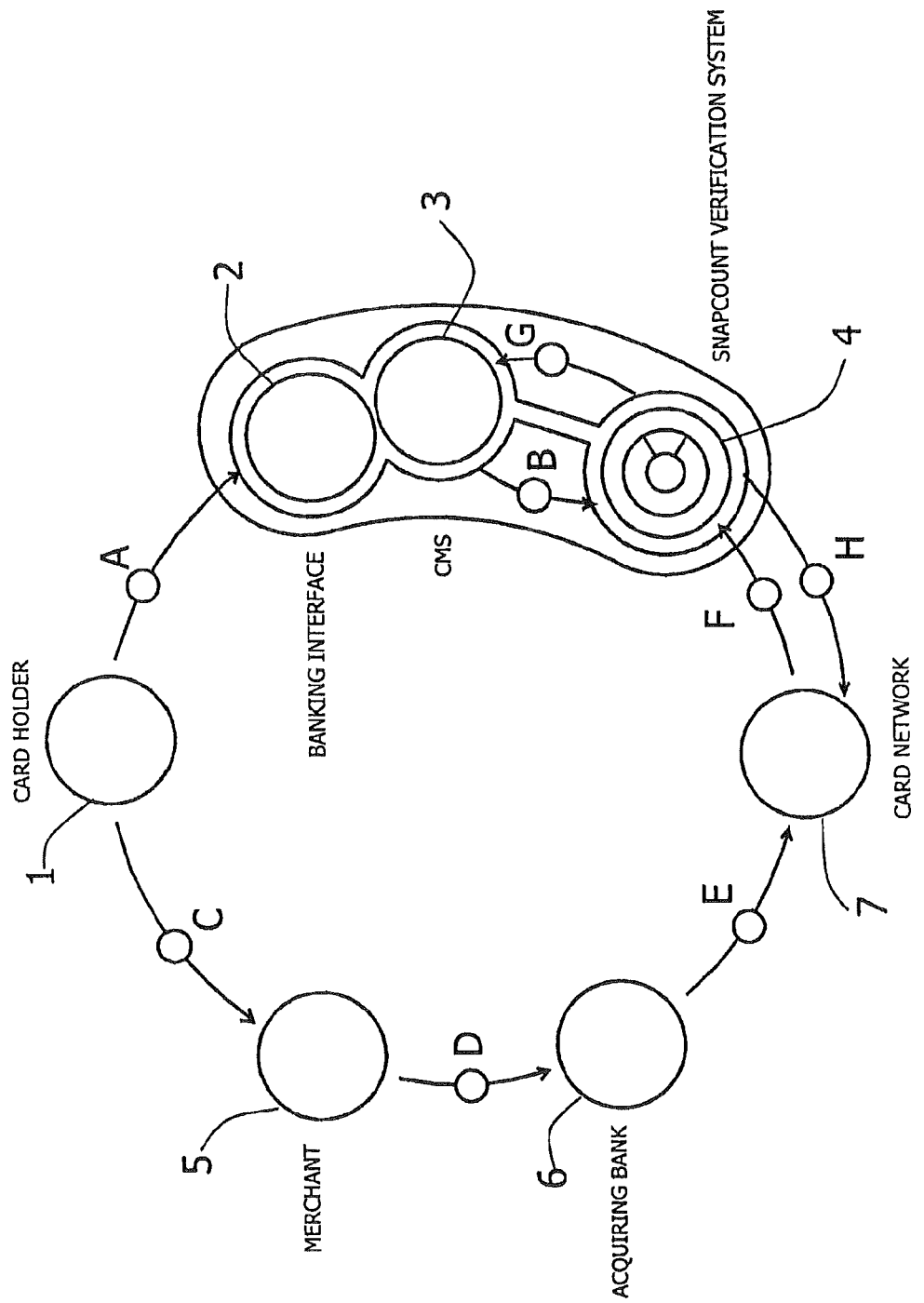
FIG. 1 is a flow diagram illustrating signal transfers for transaction processing of the invention.

Referring to FIG. 1, in overview, in a step A, a cardholder system 1 accesses a banking interface 2 via the Internet, although it may alternatively be via wireless device, telephone or branch visit. The banking interface 2 is operated by an issuing bank of which the cardholder is a customer. The interface 2 is connected to an issuing system 3, in turn connected to a verification system 4. The interface 2 allows the cardholder to input rules governing how credit card transactions with her card are to be authorized. These rules can be set according to a wide variety of parameters such as:
  deny if merchant is located outside of Ireland,
  deny if the transaction amount exceeds EUR300, or
  notify me by SMS for every transaction greater than EUR100.

The rules are updated to the verification system in a step B, and are maintained in a rule database. They can be dynamically varied by the cardholder or by issuer personnel such as a fraud manager.

In a step C the cardholder initiates a purchase transaction with her card, the transaction being handled by a merchant system 5. In a step D the merchant system 5 forwards the transaction details to an acquiring system 6, which in step E forwards an authorization request to a card network device 7. In a step F the verification system 4 executes the rules created by the cardholder in order to pass on or deny the transaction. If passed on, the issuing system 3 is updated in a step G, otherwise a deny signal is transmitted in a step H.

It will be appreciated that the systems and method allow the cardholder to be involved in the overall authorization cycle so that usage control is tailored to his or her requirements.

This opens up other services in addition to effective fraud control. For example, a rule may require for an SMS notification to be forwarded to a parent every time a card is used. This allows parents to continually monitor and track usage for parental control and information purposes. In effect, suitable rules can cause a full audit trail to be generated in real time, when the information is required and is of most benefit.

We shall refer to the sequence of FIG. 1 as being the 'authorization chain'. It can be described as a chain because it consists of the Merchant requesting an authorization from an Acquirer; an Acquirer requesting an authorization from the network and the network requesting authorization from the Issuer.

This invention inserts into this chain a device whose function is to implement Cardholder authorization rules. This device is located at an Issuer's premises or at a remote location and is connected to the Issuer's systems using secure communication means.

Figure 2A:
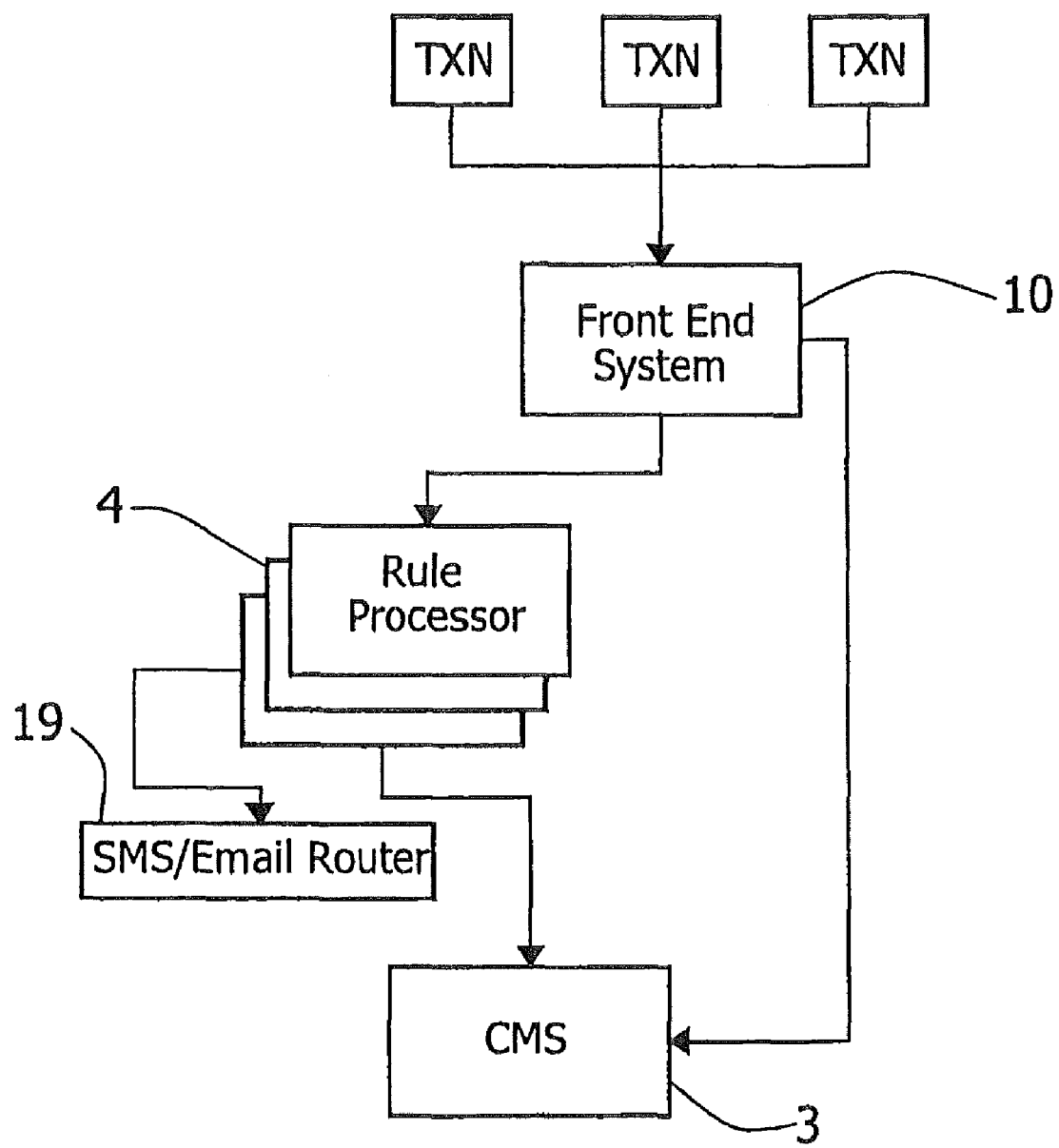
FIGS. 2(a), 2(b) and 2(c) are block diagrams illustrating alternative arrangements for connecting the components of a verification system of the invention.
Figure 2B:
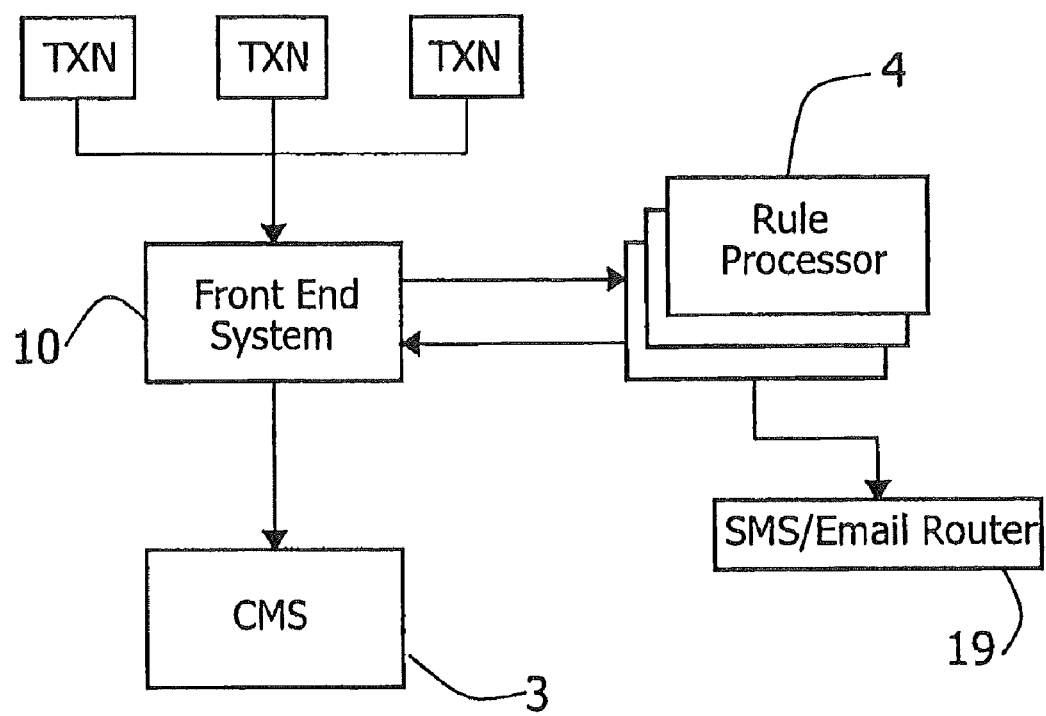
Figure 2C:
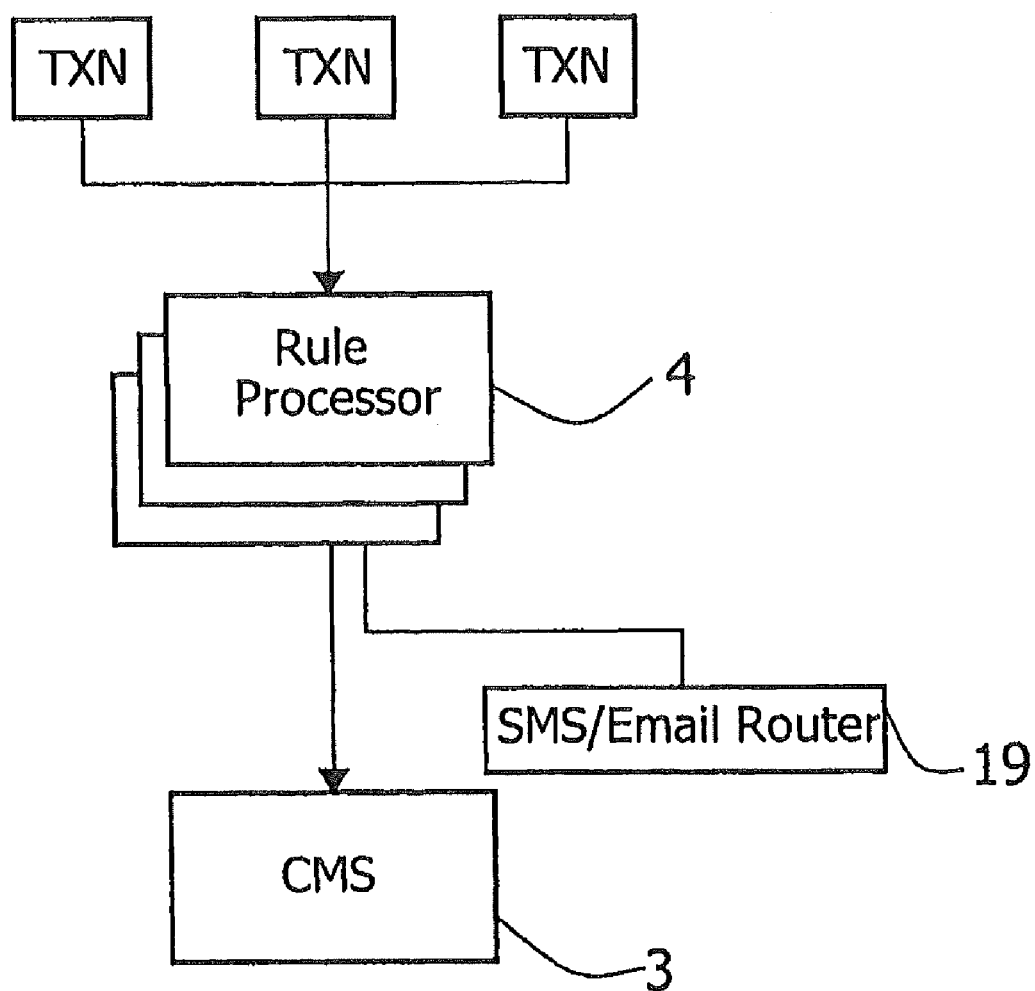

FIGS. 2(a), 2(b) and 2(c) show three alternative arrangements for integrating the verification system into an authorization system. The main components are the verification system (also referred to as the rule processor) 4, the card management (Issuer) system (CMS) 3, and optionally a front end system (FES) 10.

The function of the rule processor 4 is to decide whether a particular request should be passed on to the issuer or declined based on the processing of system, product and cardholder rules. The rule processor makes this decision by evaluating rules on the authorization request. These rules are read in from a rule database. Three types of rules can be entered into the rule database:

Rules that must be evaluated on every authorization request—'System Rules'

Rules that must be evaluated on authorization requests that relate to payment cards that form part of a particular product ("Product Rules").

Rules that must be evaluated on authorization requests that are for particular payment cards—'Cardholder Rules'.

The CMS 3 is the terminal device in the authorization chain. Authorization request responses are generated by this device. The FES 10 interfaces with the card payment network and receives authorization requests. The rule processor 4 further comprises an SMS/Email gateway 19 which allows email SMS, Electronic Message Service ("EMS"), Multimedia Messaging Service ("MMS") or any other communication format messages to be sent to the cardholders or received from the cardholders.

Figure 3:
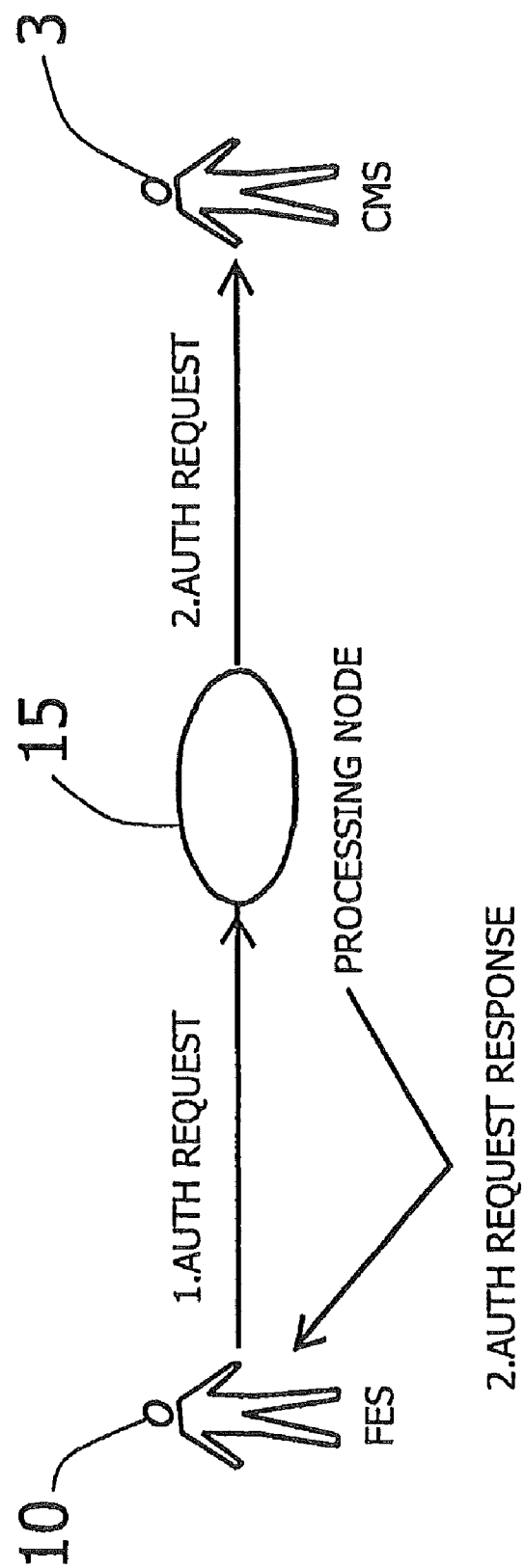
FIG. 3 is a diagram showing interaction between a front end system and a card management system.

Referring to FIG. 2(a) the rule processor 4 is connected between the FES 10 and the CMS 3. The corresponding FIG. 3 illustrates the flow of requests in this embodiment. In the normal mode of operation, an authorization request received from the card payment network moves from the FES 10 and into the rule processor 4. The rule processor decides whether the authorization request is sent on to the CMS 3, or whether an authorization request response—a decline—is sent back to the network side device. The system also supports a bypass mode of operation used by default if a malfunction or failure is detected in the rule processor. In the bypass mode requests are routed directly from the FES to the CMS.

Referring to FIG. 2(b), in another embodiment the rule processor 4 is interfaced to the FES 10. In operation, authorization requests from the card payment network received by the FES 10 are routed to the rule processor 4. The rule processor applies rules to the requests and sends them back into the FES which decides whether or not to route them to the CMS 3.

Referring to FIG. 2(c), in another embodiment authorization requests are accepted from the card payment network into the rule processor 4, where rules are applied to the requests. The rule processor then routes permitted authorization requests to the CMS 3.

The verification system (or rule processor) of the present invention is designed to integrate flexibly into existing card management (Issuer) systems. While it is possible to include additional functionality by adding more features to a particular 'card management system' because each card management system is different such an approach is problematic. The verification system is designed to be placed in the authorization chain as a separate entity within that chain. However, in order to integrate the verification system into existing card management systems significant communications issues must be addressed.

Figure 4:
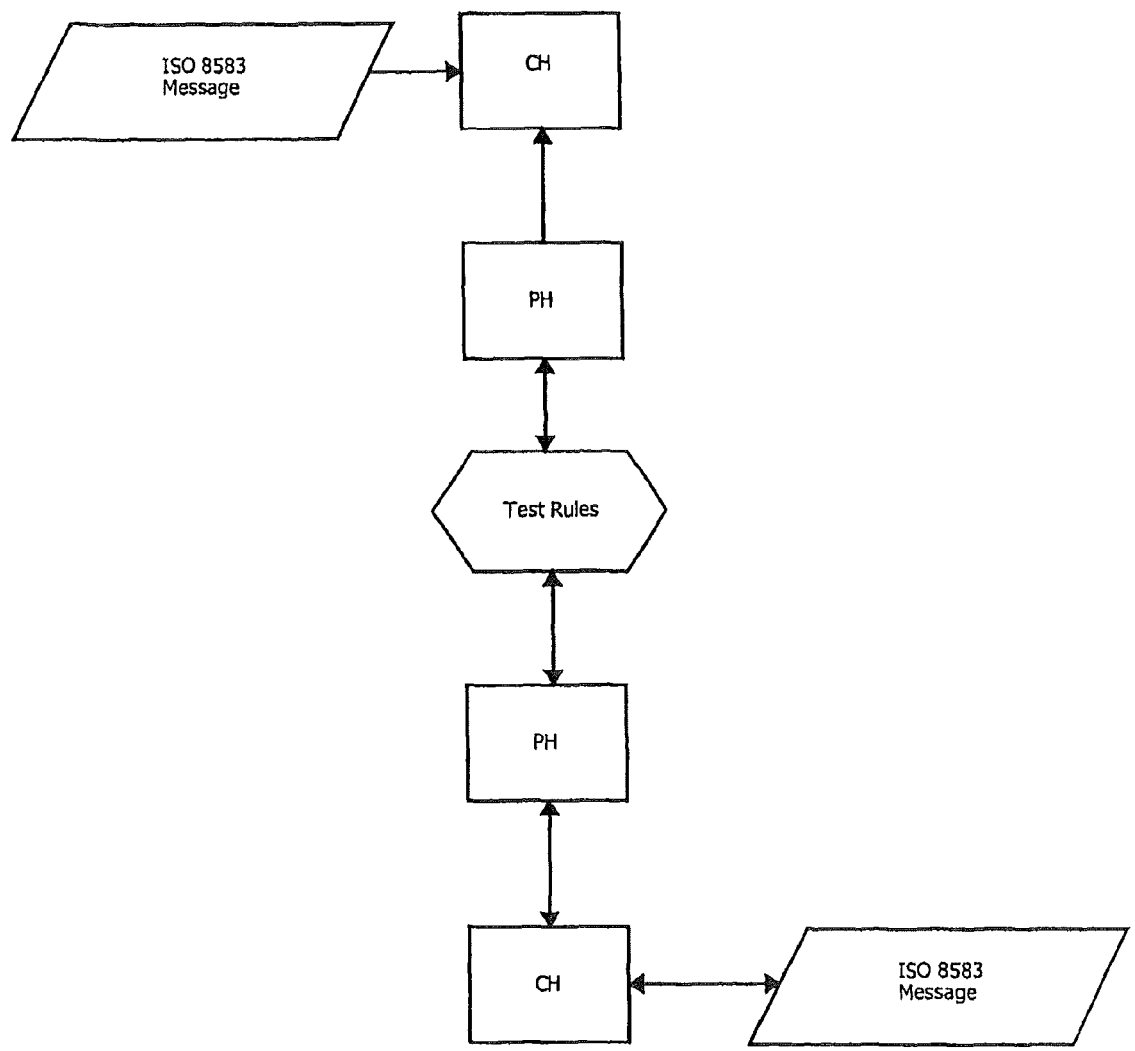
FIGS. 4, 5, and 6 are flow diagrams showing signaling at a lower level.
Figure 5:
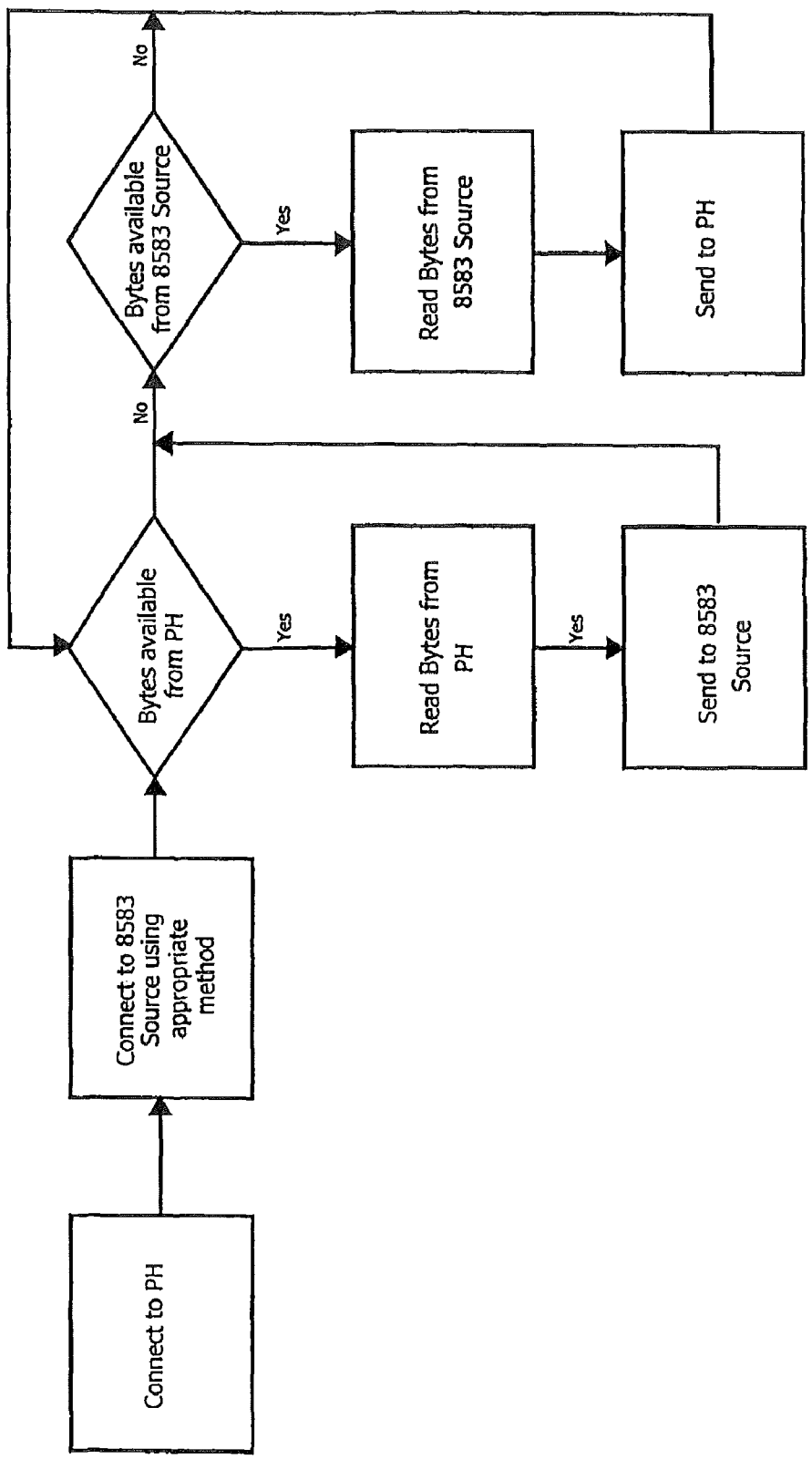
Figure 6:
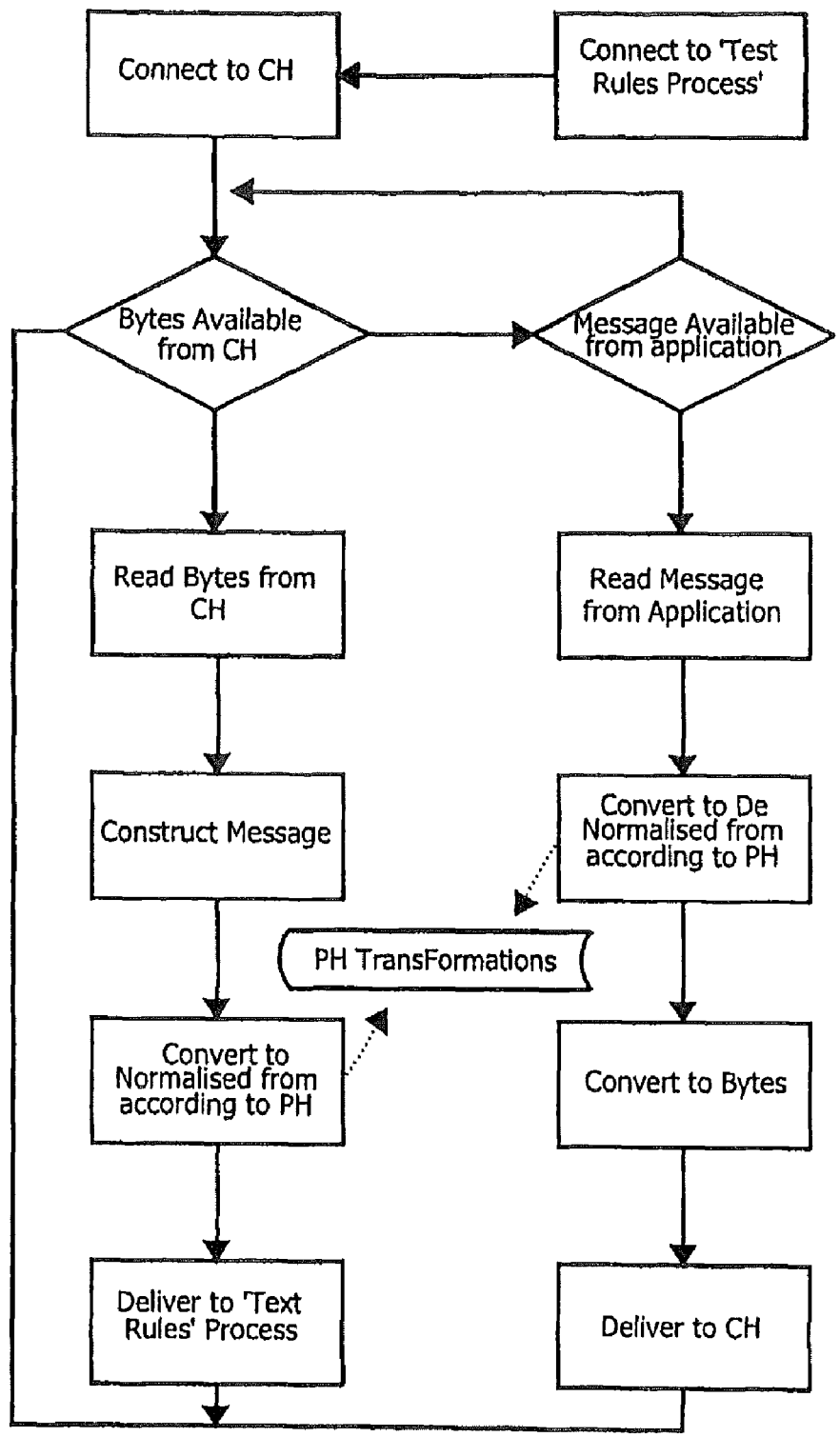

FIGS. 4 to 6 illustrate the communication modules and routing processes of the invention.

ISO8583 is used over many different types of communications media, depending on the equipment that is being used and the preferences of the institutions involved. These media include:

TCP/IP
X.25
SNA
Serial Line
Modem

Messages that are sent between entities involved in the authorization process are standardized according to the ISO8583 standard—"Bank card originated messages—Interchange message specifications—Content for financial transactions'. To facilitate connection and integration of the verification system of the invention into an existing authorization chain a module which converts messages from any particular medium into a "stream of bytes" is used. This module is a CH (Communications Header).

Referring to FIG. 4 an ISO8583 Message is read by a CH (Communications Header) from whatever form of communications channel the incoming messages are arriving on. The message is converted into a sequence of bytes and passed to a PH (Protocol Header) module. The CH is a module that sends and receives data without regard to the content. It understands and implements the specifics needed to handle connections over different media—e.g. TCP/IP, X.25, Serial and Modem. It provides common functions for the set-up, management and teardown of open connections. The PH layer converts the message from a specific 8583-message implementation into an internal 'Normalized' form. This form is independent of any vendor specific implementations.

After being processed by a 'Test Rules' process of the rule processor (described later) the message is converted from the 'Normalized' form back into a specific 8583 implementation via the PH layer, and then is sent to its destination via the CH layer.

Referring to FIG. 5 the CH connects to its PH module. It then attempts to connect to its 8583 source using the specified method (TCP/IP, X.25 or Serial). It then checks whether there are any bytes ready to be accepted from the PH module. If there are no bytes available it immediately checks whether there are any available from the 8583 source. If there are none, it immediately goes back to check whether there are any bytes available from the PH and proceeds as before.

If there are bytes available from the PH, they are read, and sent to the 8583 source, and then checks are made for bytes being available from 8583 source and PH as before.

If there are bytes available from the 8583 source, they are read, and sent to the PH, and then checks are made for bytes being available from the PH and the 8583 source as before.

ISO8583 is a standard that describes the messaging that is used to allow organizations to exchange messages that relate to 'Bank Cards'. This specification although complete in many ways is interpreted differently by different organizations. The differences relate for example to the specific meaning of a field, or the choice of field to hold a particular piece of data or how a particular response is to be interpreted. For the invention, the implication of this problem is that a message from one source may differ significantly from a message from another source, not because of any difference in the core transaction details, but because of differences between the organizations that are feeding the transactions into the verification system.

Because of this, a technique is presented for converting many known implementations of ISO8583 into a single generalized format. Examples of 8583 protocol implementations include:

| Vendor Implementation | Description |
| --- | --- |
| VISA BASE I | Visa Credit Card implementation |
| MasterCard CIS | MasterCard Credit Card implementation |
| BASE 24 Host ISO | ACI Credit Card implementation |
| Europay Host EM | MasterCard Credit & Debit Card implementation |
| VISA SMS | Visa Debit Card implementation |
| MasterCard MDS | MasterCard Debit Card implementation |

Referring to FIG. 6 the PH initially connects to a 'Test Rules' process of the rule processor. It then connects to the CH. It checks whether there are any bytes available from the CH. If there are not, it immediately checks whether there are any messages available from the Application Process. If there are none, it goes back to check for bytes from the CH and so on.

If there are bytes available from the CH, they are read and converted into a message. At this stage, the message is in the format of a vendor specific implementation of ISO8583. This message is then converted into a normalized form using transformations that are specific to this specific PH. These transformations are very much related to each vendor's implementation and thus can be arbitrarily complicated. For example, a particular field may be broken down in a particular manner by a vendor implementation.

After the normalized message is generated, it is sent to the application process. The PH then goes back to checking for bytes from the CH.

If a message is available from an application, it is read and converted to de-normalized form using PH transformations. It is then converted into a sequence of bytes and passed to the CH. The PH then goes back to checking for bytes from the CH.

Figure 7:
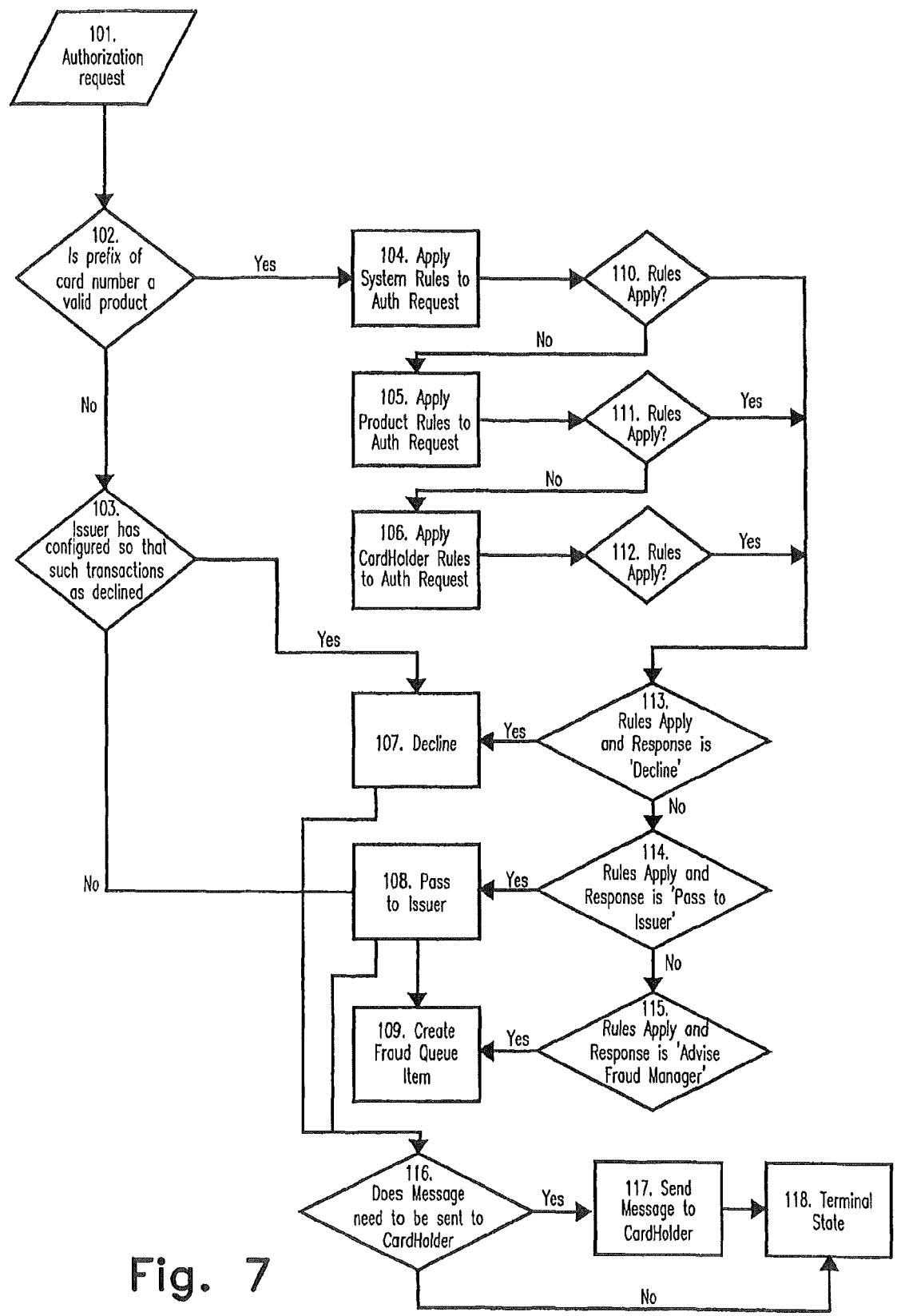
FIG. 7 is a flow diagram illustrating processing steps in more detail.

Referring to FIG. 7 the authorization cycle or "Test Rules" process of the rule processor is shown in more detail. The request is generated in step 101. If the number prefix is that of a valid product (step 102) in step 104 system rules are applied. If the rules apply 110, product rules are applied to the authorization request 105. If not, the system proceeds to applying rules to determine if there is a "decline" 113. If the product rules apply 111, the cardholder rules are applied to the authorization request 106. If not, the system proceeds to applying rules to determine if there is a "decline" 113. If the cardholder rules apply 112, the system proceeds to applying rules to determine if there is a "decline" 113. If the output is negative in step 113 a decline response is generated. Otherwise, in step 105 product rules are applied. If the output is negative, again a decline response is generated. Otherwise, the Cardholder rules are applied in step 106. Again, this may provide a positive or a negative outcome. If the result of step 113 is not negative (i.e., positive), the system proceeds to apply rules and determine if response is "pass to issuer" 114. If the result is not negative (i.e., positive), the system proceeds to apply rules determine if response is "advise fraud manager" 115. If the result is positive, the system proceeds to create a fraud queue item 109. If the prefix is not a valid product 102, the system proceeds to determine if the issuer is configured so that transactions are declined 103. If not, the system proceeds to pass to issuer 108.

The three possible outcomes of application of the sequence of three sets of rules are:
decline,
approve and pass to CMS, and
create fraud queue item.

The third outcome causes an item to be added to a fraud queue. In this embodiment, a decline outcome may cause a message to be sent to the Cardholder (steps 116, 117, 118).

Process Messages According to Defined Rules

The Cardholder can communicate through the Issuer's computer system. The Cardholder communicates with the Issuer's computer system through whatever means the Issuer's computer system supports—e.g. Internet, phone, Wireless Application Protocol ("WAP"). By doing this, the Cardholder can enter a set of rules. A rule may be in the form of IF (Condition) THEN (Action)

Each Condition can be a set of comparisons separated by AND and OR. Each comparison compares an authorization request data element with a value. An example of a condition would be:

Amount>"100.00" AND (MerchantCountry="IE" OR MerchantCountry="UK")

This example condition would apply whenever the transaction amount is greater than 100 and the Merchant is registered in Ireland or the UK.

Each action is one of three choices—either 'decline' or 'accept' or 'advise Fraud Manager or advise Cardholder in the event of an automatic confirmation system being implemented'. The term 'decline' means to not send the request onwards to the CMS, but to send an authorization rejection back towards the Acquirer. The term 'accept' means to send the authorization request on towards the Issuer. The term 'advise Fraud Manager' means to send a message to a Fraud Manager about the authorization.

In addition to cardholder rules, the Fraud Manager in the issuing institution can also enter rules. These rules can be entered at three levels. The first of these is the set of rules that are run for every transaction that passes through the system—these are termed 'system' rules. The second of these is the set of rules that are run for each 'product' that the issuing institution markets. A product in this sense is a set of credit card number ranges that are grouped together. The third of these is the set of 'template rules' for a particular product. These are pre-written rules that a Cardholder who has a card from particular product can 'opt into' without having to write the rule themselves.

The invention allows complex rules to be built and enables them to be executed in a very time-efficient manner by using template rules.

Each template is built in response to Fraud Manager inputs by the Fraud Manager and is given an index number (#1, #2, ...). Each template comprises a set of empty placeholders for up to ten conditions. Each condition comprises the following:

| | |
| --- | --- |
| Template index Number | Unique identifier for this template. |
| Field Number | Number of field in message |
| | E.g. 'Field32 could be Merchant Country' |
| Relational Operator | Relational operator to apply to field |
| | E.g. - 'equals'/'does not equal'/'is less than'/'is greater than' |

-continued

| | |
|---|---|
| Value | Value to compare against |
| Logical Operator | Operator to use with next condition<br>E.g. - 'AND'/'OR' |

Also associated with each template is an 'Action'. This is the action to take if the condition evaluates to 'True'. Each action is composed of the following elements:

| | |
|---|---|
| Event | Event that should take place<br>E.g. - 'Decline'/'Approve'/'Advise' |
| Direction | Direction to send message<br>E.g. - 'Forward'/'Back' |
| Response Code | Value to set in 'Response Code' field of message.<br>E.g. - '01 - refer to Card Issuer' |

Each template also includes 'Notification' fields. These fields indicate whether an Email or SMS notification should be sent if the condition above evaluates to 'True'.

Cardholder Rules

Each cardholder rule comprises a reference to a template and any information required by that template. Accordingly, the fields involved are:

| | |
|---|---|
| Card Number | The unique number of the card |
| Template | The number of the template to which this rule refers. |
| Parameter1 | If any conditions for this template require a parameter (e.g. Template condition is 'Amount >= User_Specified_Amount), the first of these parameters is stored here. |
| Parameter2 | As Parameter1 above. |
| SMS Address | SMS Address of this cardholder if required. |
| Email Address | Email Address of this cardholder if required. |
| Sequence | Sequence in which the rules associated with this cardholder should be executed. |

All of the cardholder rules in the system are stored in the system database and are indexed and clustered on card number.

Real Time—Not Batch

The invention allows Cardholders and Fraud Managers to view and modify rules while, at the same time, processing authorization transactions using these rules. Updates to the rules can be made in real time with the effect of such a change being immediate.

In order to allow this to occur, 'database transactions' are defined for the purposes of reading and updating the table in which rules are stored. The purpose of these transactions is to allow updates to rules to occur in the moments between one authorization transaction and the next.

Processing Efficiency

The processing efficiency of the system is based upon the time taken to read all rules related to a particular card out of the database and the time taken to computationally apply the rules to the transaction in hand.

Having cardholder rules refer to templates rather than exist in a stand-alone manner makes each cardholder rule very small (<100 bytes). This means that a minimal amount of disk space will be used per rule, and so more rules can be read per database read.

By clustering the cardholder rules within the database on Card Number, all rules related to a particular Cardholder can be read in one disk read by the database.

By allowing templates to have specific placeholders for conditions, values and logical operators there is no requirement for the normal parsing of logical string-based expressions. Processing can proceed without the need for intensive string parsing.

Referring to FIG. 8, an example of a database object containing two templates and two sets of Cardholder rules is illustrated.

Template #1 contains the rule:
IF (Field32='Africa' OR Field32='Asia' OR Field32='Australia')
THEN
Sent Decline Back with Response Code 2
Send SMS and Email to Cardholder
Template #2 contains the rule:
IF (Field41.2='20' OR Field41.2='20)
THEN
Send Decline Back with Response Code 2
Cardholder Rules for card '1234123412341234':
IF (Card Number is '1234123412341234')
Apply Template 1 with no parameters,
and SMS Address 0872337868
and Email Address joebloggs@aol.com
Apply Template 2 with no parameters,
and no SMS Address
and no Email Address
Cardholder Rules for card '9999999999999999':
IF (Card Number is '9999999999999999')
Apply Template 1 with no parameters,
and SMS Address 0872337868
and Email Address joebloggs@aol.com FIGS. 9 to 25 illustrate how Issuer Personnel and Cardholders interact with the rule processor.

Users of the system are as follows:

| User | Role |
|---|---|
| Cardholder | The Cardholder is a person who holds a credit card, which has been issued by the Issuer. The invention primarily allows the Cardholder to add rules that control how his/her card is used. |
| Fraud Manager | The Fraud Manager is an employee of the Issuer. The invention allows this person to add rules to particular control how particular credit card products operate. This can be done in order to reduce Fraud, or in order to create new types of credit card products with different operating profiles. |
| CSR | The Customer Service Representatives answer queries from Cardholders. The invention allows CSRs to perform all of the tasks that a Cardholder can perform. Also, the CSR is able to view details on the authorization requests and responses for particular cards over given time periods. |
| Technical Operator | The Technical Operator is responsible for starting and stopping the system, editing database data, applying new configuration data to the system and checking the status of the system. |
| Auditor | The Auditor is allowed see, at a great level of detail the decisions being made by the system, and is able to trace these decisions back to individual messages and rules. |

The Fraud Manager is that person in the Issuing Institution whose function is to track and minimize the incidence of fraud in the institution. This person and the Cardholder are the prime users of the system 4. The Fraud Manager configures the system 4 according to the needs of the Issuer. FIGS. 9 to 15 illustrate some interactions of the Fraud Manager with the system.

Figure 9:
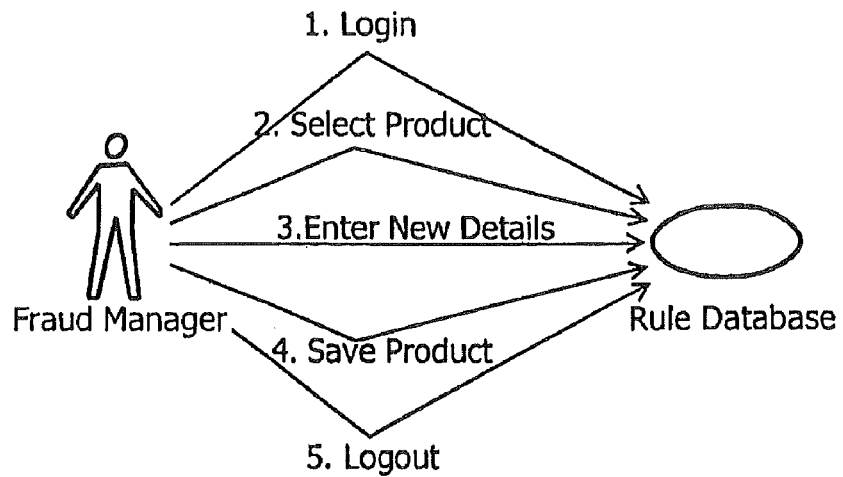
FIGS. 9 to 13 are diagrams illustrating interactions between a fraud manager and a rule database.

Fraud Manager Adds or Modifies Products (FIG. 9)

The Fraud Manager must define those products that the Issuer uses. A product is a set of credit cards that a Fraud Manager wishes to view as a single entity for the purpose of applying rules to them. These may in fact be individual products that the Issuer offers its customers (e.g. Standard Card, Gold Card, Platinum Card) or they may be collections or subsets of same.

Figure 10:
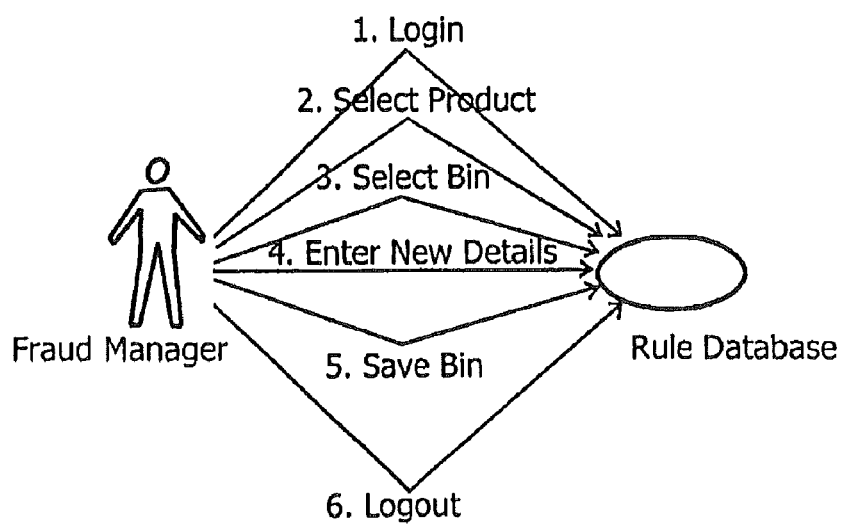

Fraud Manager Adds or Modifies BIN (FIG. 10)

Each Issuer has a set of allocated credit card number prefixes (Bank Identifier Numbers or 'BIN's). In the natural course of events, it divides these up between the products that it creates. For instance, it might create a student credit card product, a normal credit card product and a gold credit card product. These products, and their associated BIN's are entered into the system as part of the product definitions.

Figure 11:
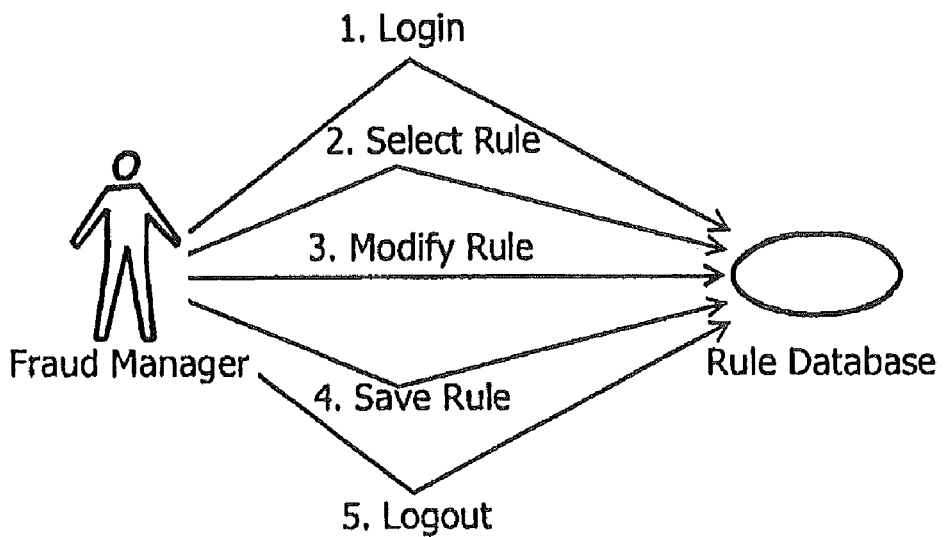

Fraud Manager Modifies System or Product or Template Rules (FIG. 11)

The Fraud Manager can add rules to the system 4 of types 'System', 'Product' or 'Template'. Rules lie at the core of the system 4 and are in three types. Each rule type is applied in the following order to each authorization request message:

System Rules are applied to all messages arriving from the network.

Product Rules are applied to all messages in particular BIN ranges arriving from Network.

Cardholder rules are applied to all messages that relate to a particular credit card number. A Cardholder rule can be created in one of two ways:

It can be created by the Fraud Manager as a template rule, and can then be opted into by the cardholder. For example, the Fraud Manager might create a template rule that defines how to reject a transaction if the Merchant is not a European merchant. A Cardholder might then be asked whether they wanted to 'switch on' this rule on their card. If they decide to, a new rule is generated for them, based on the template rule.

The Cardholder can generate it directly.

Figure 12:
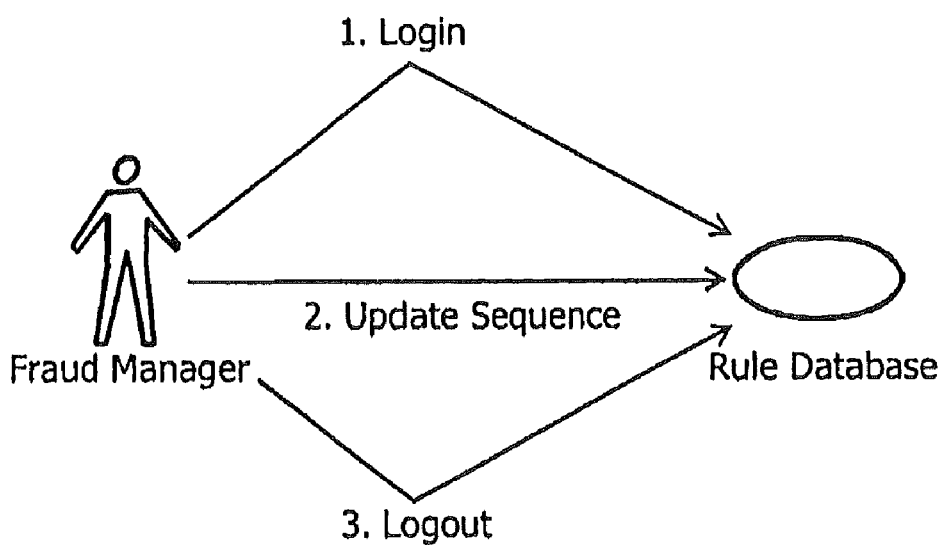

Fraud Manager Modifies Rule Sequence (FIG. 12)

The order of execution within each set of rules (system, product and cardholder) can be modified by the Fraud Manager as required.

Figure 13:
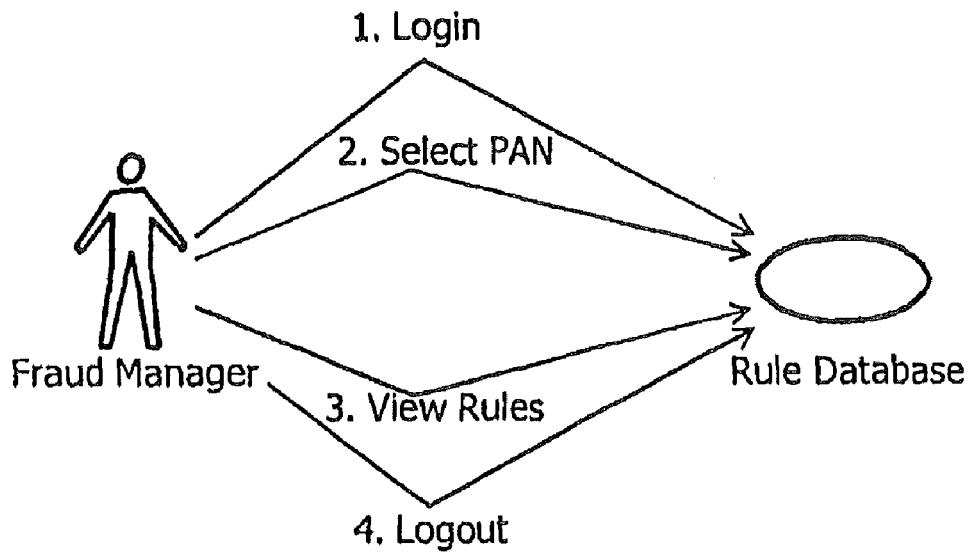

Fraud Manager Views Cardholder Rules (FIG. 13)

The Fraud Manager can view but not modify Cardholder rules. A "PAN", is the industry term for a credit card number ("Primary Account Number").

Figure 14:
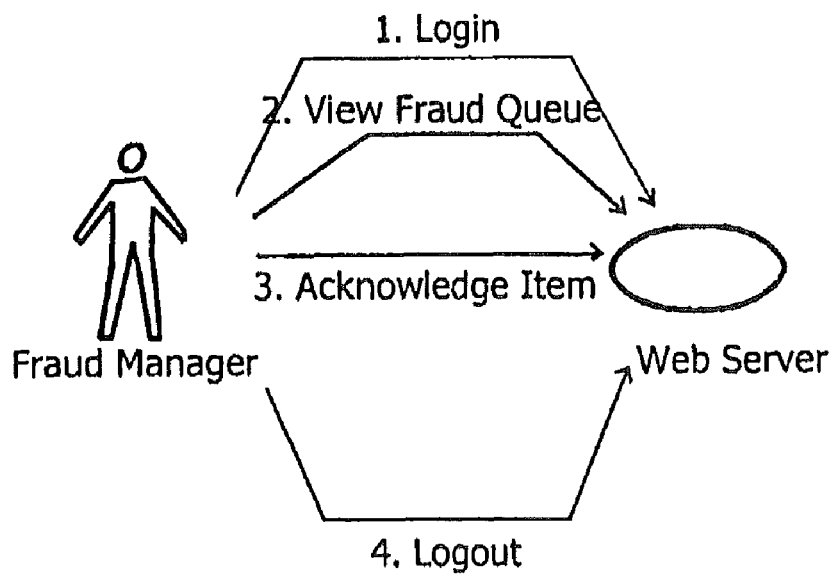
FIGS. 14 and 15 are diagrams showing interactions between a fraud manager and a Web server.

Fraud Manager Reviews Fraud Queue and Acknowledges an Item (FIG. 14)

A fraud queue is a queue of issues that Fraud Managers go through on a regular basis. These issues are those items that have matched rules whose action was 'Advise Fraud Manager' or 'Decline'. Each item on the fraud queue has to be acknowledged by a Fraud Manager. Several different Fraud Managers can be looking at the fraud queue and acknowledging items at the same time.

Figure 15:
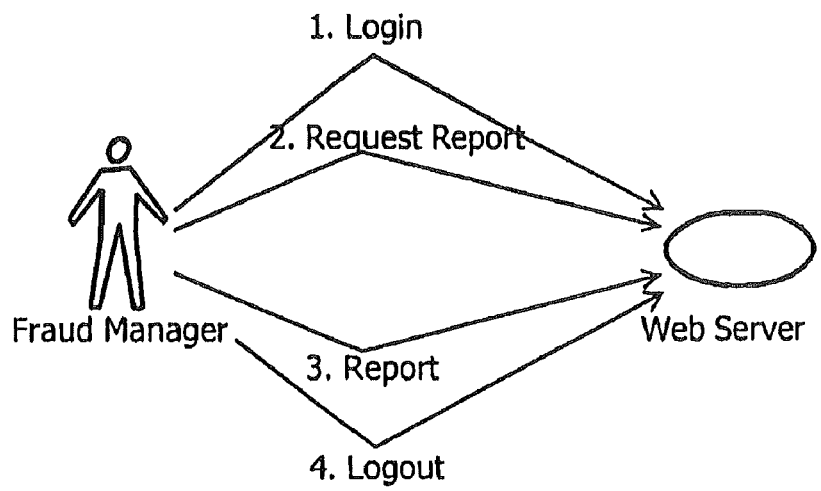

Fraud Manager Requests Report (FIG. 15)

The Fraud Manager can get various reports from the system 4. These can relate to fraud queue, activated rules, tracked rules, active rules, and suspended rules.

Figure 16:
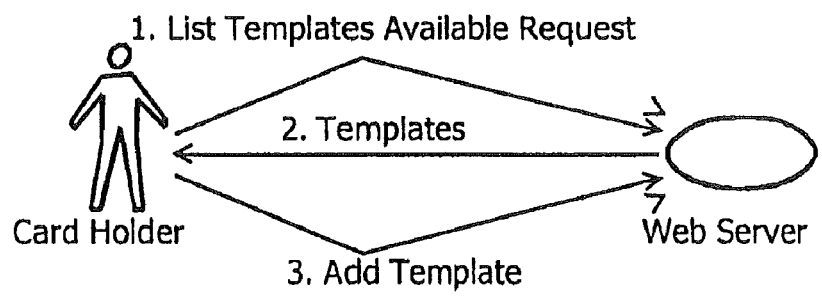

Fraud Manager Sets Up System Options (FIG. 16)

There are various system settings that the Fraud Manager needs to set up. These settings are global, i.e. in that they apply to all products.

Monitor only without declining

Archival Options—when to archive and how old items must be before they are archived.

Figure 17:
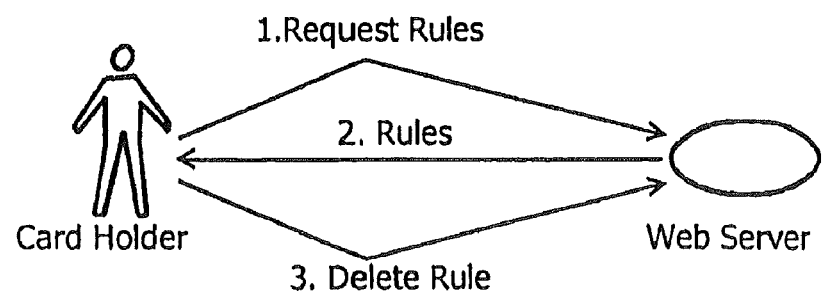

FIGS. 16 and 17 illustrate how a cardholder can interact with the system. The Cardholders can enter rules themselves. One way that they can do this is by choosing to have a particular rule from a template enabled. The list of templates available to a Cardholder whose payment card is part of a particular product might be:

Deny Access Outside Ireland
Deny Access Outside Europe
Deny Access Outside Europe and US
Deny Access to Internet Merchants
Deny All Transactions unless Specified
Deny All Internet Transactions unless Specified
Allow One-Time Transaction for (£50, £100, English Pound.500, £1000)

Alternatively, the Cardholder can define a Rule from scratch in the same way that the Fraud Manager defines one.

Cardholder Requests List of Templates Available for Credit Card Number, and adds One (FIG. 16)

The invention provides the interface to the Issuer's online banking system. This interface is web-based, although it is not expected that the web interface is delivered directly to the Cardholder. Rather, it is expected that the web-based interface is driven by the Issuer's computer systems. Here a list of template rules is provided, from which the Cardholder can add one or more for their particular credit card.

Cardholder Requests List of Current Rules for Cardholder and Can Delete One (FIG. 17)

Referring to FIG. 17, the Cardholder requests a list of current rules available and selects the option to delete one. The Cardholder requests the set of rules that are set up for a particular Personal Account Number ("PAN"). The Cardholder can then optionally delete one of these rules.

The Cardholder generates a new rule rather than choosing from a list of pre-defined template rules and applies this rule to the credit card.

Figure 18:
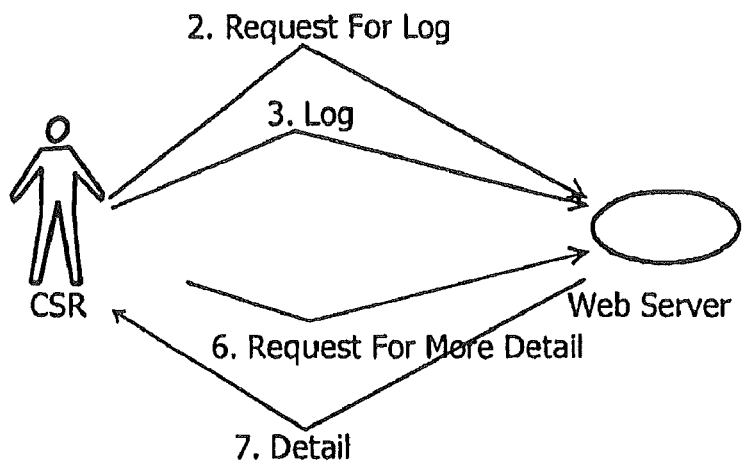
Figure 19:
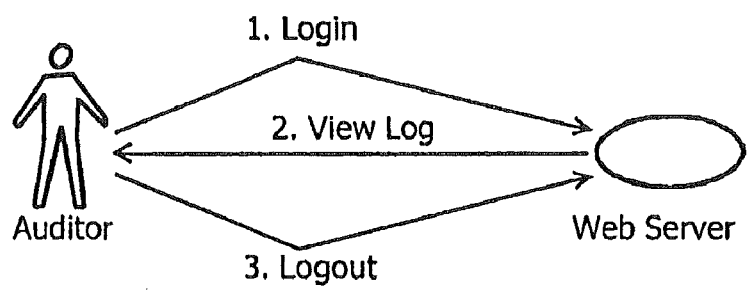

As shown in FIG. 18 the system supports access by a Customer Service Representative. The Issuer's CSR (Customer Service Representative) can perform all functions that a Cardholder can perform as well as one other. The same interface is used for CSR functions as is provided for Cardholder functions. It is expected that an Issuer's existing CSR application will be integrated to allow this extra functionality.

Referring to FIG. 18, the CSR can see logged activity for a credit card number over a time range. The CSR can look into a particular item and see the underlying message if available.

Functional Requirement—Allow Auditor to Verify Integrity of System

The Issuer's auditors—internal and external—must be able to see how and why the software functions in the way that it does. The overall functionality of the system is to allow Issuers and Cardholders to selectively decline transactions, so the reason for a transaction either being declined or not has to be clear to an Auditor.

Auditor Views Transaction Log (FIG. 19) The Auditor can look into the transaction log to see the detail of the processing of the system.

Figure 20:
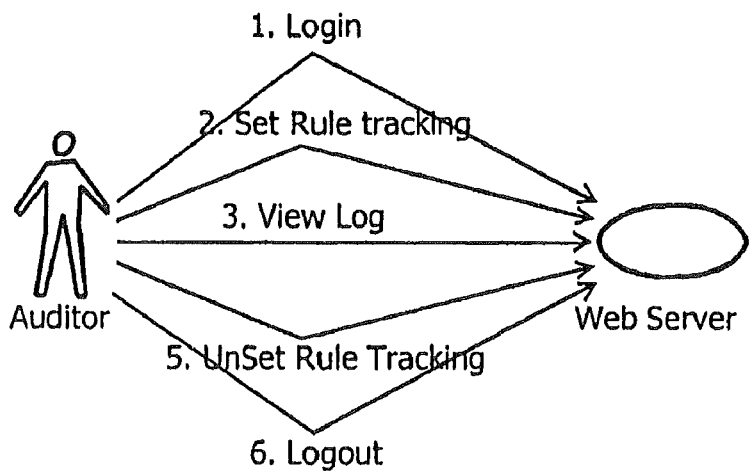

Auditor Examines One Particular Set of Rules in Detail (FIG. 20)

The Auditor can enable rule tracking, which enables the Auditor to track all of the decisions relating to a particular rule. When rule tracking is switched on the Auditor will see each condition being tested and the result of the test.

Functional Requirement—Allow Technical Team to Control and Configure System

The Technical Operator has the job of configuring the system for use, and maintaining it thereafter. Most of this configuration resides in the database. However, it would be inefficient for the processing nodes to have to read their own configuration from the database. Instead their configuration is loaded into a local database on each processing node. This means that there is a requirement for parts of the database to be loaded into the local database on each processing node by the Technical Operator.

Figure 21:
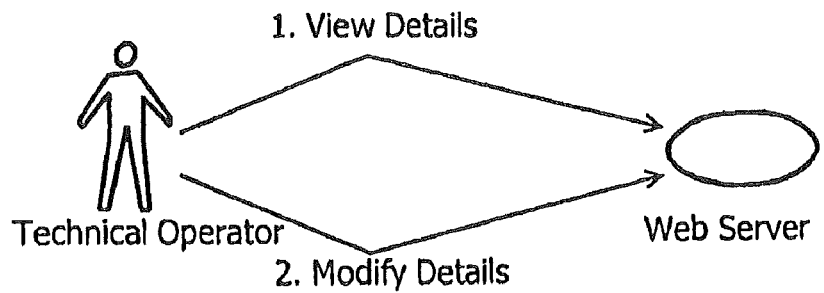

Technical Operator Modifies Database Through Web Browser (FIG. 21)

The Technical Operator can modify all tables in the database through a web browser.

Figure 22:
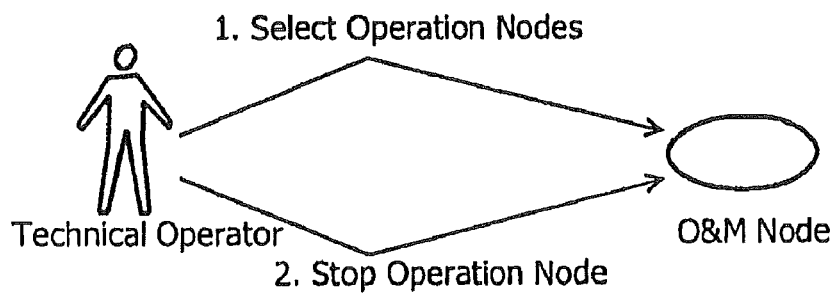

Technical Operator Starts/Stops Processing Nodes (FIG. 22)

The Technical Operator uses an application to allow the starting and stopping of each processing node 15 as shown in FIG. 3.

Figure 23:
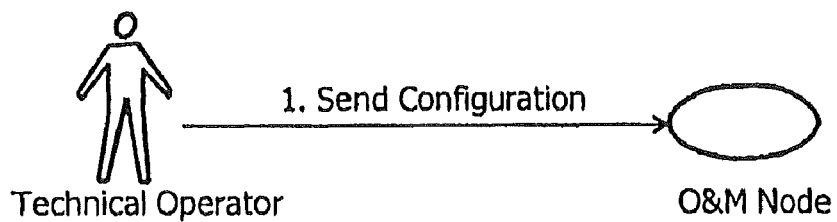

Technical Operator Sends New Configuration to the Processing Nodes (FIG. 23)

The technical operator must instruct the processing nodes to begin using the new registry that they have been sent, This is achieved with this use case.

Figure 24:
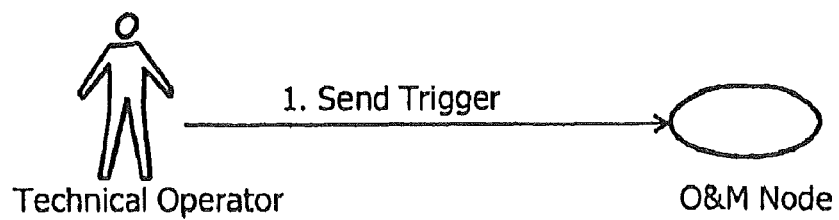

Technical Operator Triggers the Processing Nodes to Begin Using a New Configuration (FIG. 24)

The technical operator must instruct the processing nodes to begin using the new registry that they have been sent, This is achieved with this use case.

O&M Node Checks Status of Processing Nodes (FIG. 25)

The O&M Node sends a status request message once every 10 seconds to each O&M node. The O&M node replies with a response, and on the basis of this, the O&M Node database entry is updated.

Functional Requirement—Perform All System Maintenance Functions Automatically

At the end of each period (such as a day), the system 4 must run several procedures automatically.

Database is Backed up (FIG. 26)

The database is backed up to tape on a nightly basis.

Database is Restored (FIG. 27)

The data on tape can be restored into the database.

The system 4 generates a large number of messages and logged items. These objects are taken out of the database after they have been there for a period of time in order to prevent the database from growing too large. Over time, the expired rules (rules that are past the end of their stop date) must be archived. Management information (MIS) reports are run from a different database server. Entities relevant to MIS reports are copied into a separate database.

Fraud Alarm/Rejection Alarm/Authorization Confirmation

This invention allows notifications (SMS/email) that are sent to cardholders to serve different functions:

They can be configured to act as a 'Fraud Alarm'

Rules are set within the rule processor to prevent fraud. When a rule infringement and possible fraud is detected, a fraud alarm can be triggered and a notification sent to the cardholder in order to alert them of possible fraud.

They can be configured to act as a 'Rejection Alarm'

A notification can be sent to alert the cardholder about a transaction that has been declined for a reason other than the infringement of a rule. For instance, if the card management system decides that a particular transaction would push a cardholder over their credit limit, it normally does this silently. However, the invention can be configured to see this rejection and to send a message to the cardholder informing them of the rejection.

They can be configured to act as an 'Authorization Confirmation'

A notification can be sent to a cardholder whenever a transaction is approved. A cardholder may wish to use this feature to maintain an email log of all transactions on a card.

The invention can be configured to see all approvals and to send a message to the cardholder informing them of the approval.

Card Activation

Much credit card fraud exists in the form of "Mail Fraud". This fraud occurs when a fraudster intercepts a latter containing a credit card, which is on the way to a cardholder.

In order to eliminate this form of fraud, the system 4 can establish rules denying the use of each recently issued credit card until an activation event occurs. This activation event can have a number of forms:

The cardholder goes to an ATM machine and enters the new card followed by the allocated Personal Identification Number ("PIN"). A transaction is then sent to the issuing bank from the ATM. This transaction is specially formatted to that when the transaction goes through to the processor of the invention, the processor deactivates the rule that is denying the card use. The card is thus "Activated".

Alternatively the cardholder could use his/her computer to access and switch off the rule that is denying the card's use. The card can be thus activated.

Online-Banking Access

The invention allows rules to be accessed by Cardholders through an online banking platform. The online banking platform is responsible for construction of credit card management web page. The online banking platform calls the verification system in order construct the required web page.

The verification system of the invention provides four services to the online banking platform to aid it in constructing the card management web page:

List all rules that a Cardholder can switch on.
Display all rules that a Cardholder can switch off.
Switch a rule on.
Switch a rule off.

Figure 28:
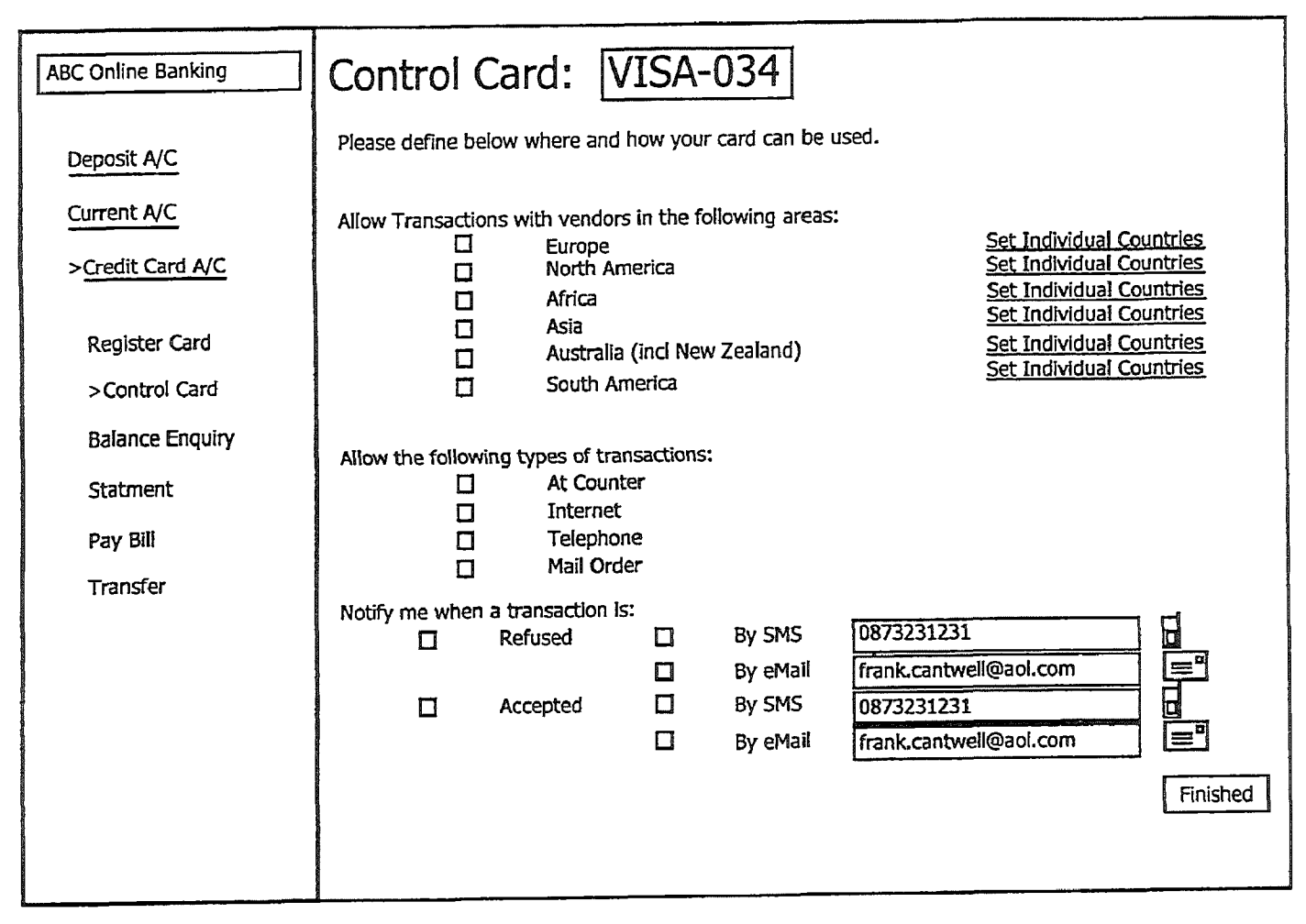

Referring to FIG. 28, a screen of the interface 2 is shown, the screen shown is an example of a basic rule activation screen. The customer can access this screen through their online banking channel, at an ATM, or through a customer representative. This basic rule activation is part of the existing renewal or registration process. For example the Issuer may inform the Cardholder that their card will not operate in a specific geographic region that may be sensitive to fraud unless the Cardholder informs them to the contrary by telephone or online that there are specific countries that they wish to "turn on".

Figure 29:
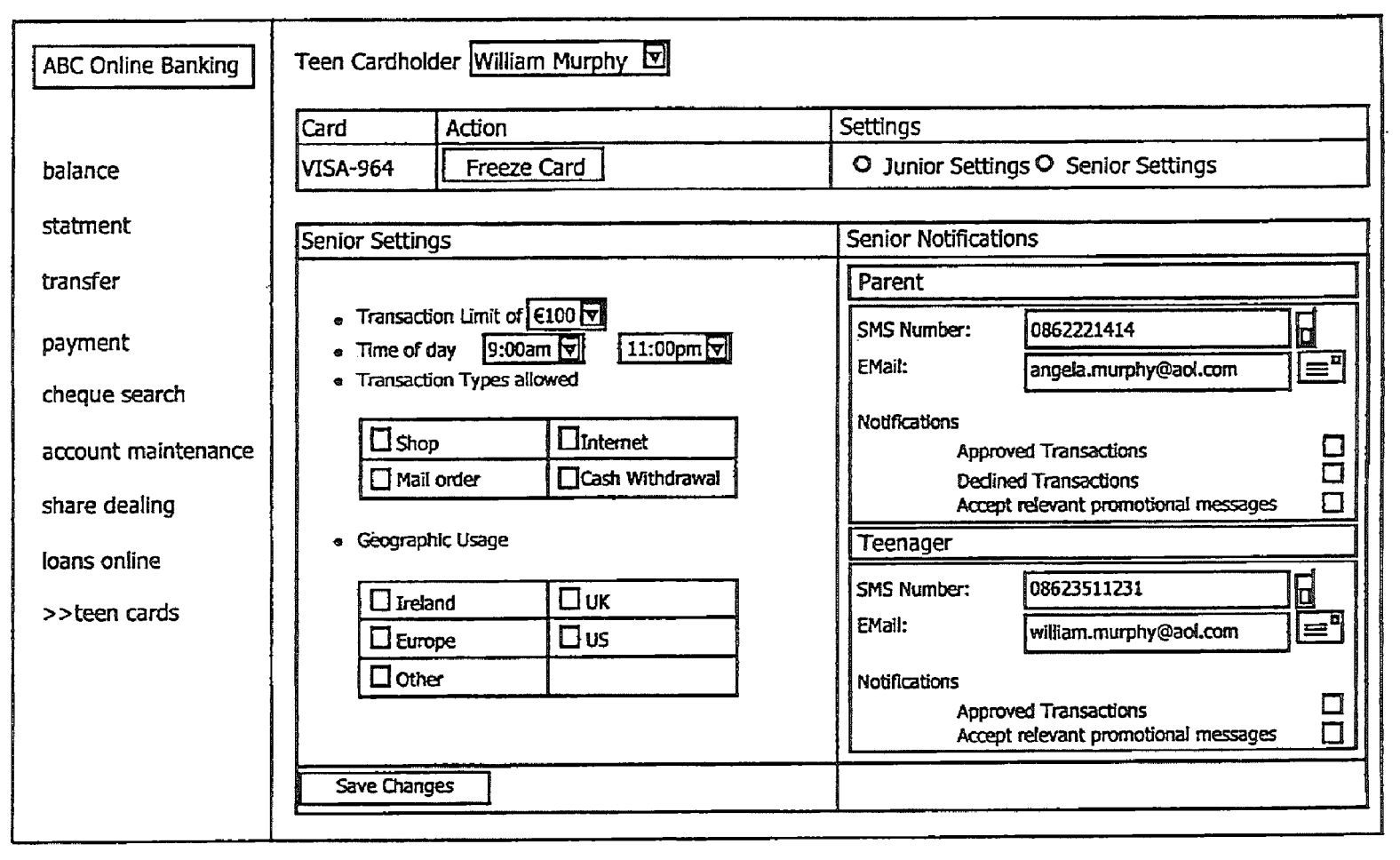

In another application, as shown in FIG. 29, a customer segment uses the verification system through the card product they have chosen to use i.e. where the card product has predetermined parameters e.g. transaction type or geographic set to Issuer determined defaults when the card is issued but changed by the Cardholder to suit their own particular requirements whether it is security or control they are concerned about.

These products are designed for Cardholders who may wish to have more active participation in how a card is used, for example, an ancillary card issued by a parent to a child where the parent wishes to control how, where and when the card is used by the child. FIG. 29 illustrates an example of a parent controlled teenager card and how the verification system enhances the security and control for the parent.

The card product design of this particular customer segment would be driven by specific customer needs for credit control and security. An example of this would be a corporate Card Manager as detailed in FIG. 30. Designed for the corporate market where a financial controller may wish to centrally control the individual usage profiles of the company's payment card base using rules similar to previous examples.

Rules could also exclude specific merchants or alternatively may allow the card to be used only at specific merchants i.e. as a controlled purchasing card.

Transaction rules form an important part of the operation of card management systems by card issuers. These are rules that are usually applied at either a system level i.e. a rule that will apply to all cards issued by that institution or at a product level i.e. a rule that will apply to a particular card product such as a Gold Card. An example of a rule might be to deny or refer all transactions from a country that is deemed to be a particular hotspot for card fraud.

It will be appreciated that the invention allows the cardholder to control what happens in the authorization process via the establishment of a rule set that will apply to all cardholder's transaction. The cardholder can remotely create, delete or amend rules e.g. through online banking channels. In addition the invention at the Issuers discretion allows for the cardholder to be alerted in real-time of a rule infringement thus alerting him to potential misuse of their payment card and allows them to respond automatically to this alert in real-time to confirm their authenticity thus allowing the transaction to proceed.

It is expected that the invention will reduce and displace the incidence of fraud in payment card networks. It effectively helps manage the risk of card fraud. The system can be used as a complementary technology and as such the card Issuers can implement it as another line of defense in the fight against fraud.

The invention is not limited to the embodiments described but may be varied in construction and detail.

We claim:

1. A transaction processing system implemented using at least one programmable data processing apparatus, for processing requests to authorize card transactions, comprising:
   a request interface configured to receive requests from customers to authorize card transactions,
   a rule database configured to store cardholder rules,
   instructions to generate positive and negative authorization outputs based on authorization requests received from the request interface,
   (A) setup means for storing cardholder rules, each cardholder rule being associated with at least one customer wherein the setup means comprises:
      (i) a fraud manager interface enabling a fraud manager with access control to:
         (a) define templates, wherein each template comprises a structure of placeholders for population with information specifying at least one action and at least one notification, the information including authorization request message fields, relational operators, values, and logical operators,
         (b) populate placeholders of a template with information to generate a template rule, and
      (ii) a definition interface configured to:
         (a) select at least one template rule, and
         (b) select and populate at least one of the defined templates to generate at least one cardholder rule referring to the at least one selected template and the information populating the template, and specifying an action and a notification, and
   (B) authorization means for dynamically retrieving from the rule database a cardholder rule associated with a customer of each authorization request on a per-transaction basis, for applying the retrieved cardholder rule to the transaction request, and for executing the cardholder rule with reference to a template rule and implementing the action and notification specified in the template rule, and an authorization interface for transmitting the positive and negative authorization outputs.

2. The transaction processing system as claimed in claim 1, wherein: the rules database is configured to store system rules which apply to all transactions, and product rules which apply to groups of cards, and index said cardholder rules on card number, and the authorization means includes means for retrieving system rules and product rules and to successively apply said system, product, and cardholder rules upon receipt of an authorization request.

3. The transaction processing system as claimed in claim 1, wherein said template rules are stored in a format which does not require parsing of logical string-based expressions for processing.

4. The transaction processing system as claimed in claim 3, wherein the authorization means includes means for receiving confirmation of authorization from a customer in response to a notification.

5. The transaction processing system as claimed in claim 1, further comprising a network interface for a card payment network, and a card management system interface for an issuer card management system.

6. The transaction processing system as claimed in claim 5, wherein the network interface and the card management system interface each comprises a communication header module configured to convert received messages into a standardized data sequence of bytes.

7. The transaction processing system as claimed in claim 6, wherein the network interface and the card management system interface each comprises a protocol header module comprising means for converting the standardized data sequence of bytes into an internal format for processing.

8. The transaction processing system as claimed in claim 6, wherein the communication header and the protocol header modules comprise means for sequentially checking for, receiving, converting and routing messages and data.

9. The transaction processing system as claimed in claim 6, wherein the communication header and protocol header modules are configured to route transaction requests and responses between a card payment network a card management system.

10. The transaction processing system as claimed in claim 1, wherein the authorization means includes means for automatically transmitting at least one of a notification to at least one of the fraud manager or a customer once a possible fraud is detected or an authorization request result to a customer.

11. The transaction processing system as claimed in claim 1, wherein said setup means comprises means for providing at least one of an on-line banking interface or an automated teller machine interface.

12. The transaction processing system as claimed in claim 1, wherein the authorization means includes means for receiving a cardholder request that a card be deactivated.

13. The transaction processing system as claimed in claim 1, wherein the authorization means includes means for receiving a Short Message Service from a cardholder to deactivate a card.

14. A computerized method for processing requests to authorize card transactions, comprising:
   storing cardholder rules on a non-transitory computer readable medium, each cardholder rule being associated with at least one customer;
   defining templates, by a fraud manager with access control as enabled by a fraud manager interface, wherein each template comprises a structure of placeholders to be populated with information specifying at least one action and at least one notification, the information including authorization request message fields, relational operators, values, and logical operators, populating template placeholders, by said fraud manager, with information to generate a template rule, receiving at least one template rule selection, and generating at least one cardholder rule, based on received user input, referring to the at least one selected template and the information populating the template, and specifying an action and a notification, and dynamically retrieving, on a per-transaction basis from the rule database, a cardholder rule associated with a customer from each authorization request, applying the retrieved cardholder rule to the transaction request, executing the cardholder rule with reference to a template rule, implementing the action and notification specified in the template rule, and transmitting the positive and negative authorization outputs.

15. The computerized method of claim 14, comprising storing system rules which apply to all transactions, and product rules which apply to groups of cards, and indexing said cardholder rules by card number, and retrieving system rules and product rules and to successively apply said system, product, and cardholder rules upon receipt of an authorization request.

16. The computerized method of claim 14, comprising storing said template rules in a format which does not require parsing of logical string-based expressions for processing.

17. The computerized method of claim 16, comprising receiving further functions to receive confirmation of authorization from a customer in response to a notification.

18. The computerized method of claim 14, comprising interfacing with a card payment network, and interfacing with an issuer card management system.

19. The computerized method of claim 18, comprising converting received messages into a standardized data sequence of bytes.

20. The computerized method of claim 19, comprising routing transaction requests and responses between a card payment network a card management system.

21. The computerized method of claim 19, comprising converting the standardized data sequence of bytes into an internal format for processing.

22. The computerized method of claim 19, comprising sequentially checking for, receiving, converting and routing messages and data.

23. The computerized method of claim 14, comprising receiving a Short Message Service from a cardholder to deactivate a card.

24. The computerized method of claim 14, comprising automatically transmitting at least one of a notification to at least one of the fraud manager or a customer once a possible fraud is detected or an authorization request result to a customer.

25. The computerized method of claim 14, comprising receiving input from at least one of an on-line banking interface or an automated teller machine interface.

26. The computerized method of claim 14, comprising receiving a cardholder request that a card be deactivated.

27. A non-transitory computer readable storage medium encoded with instructions that, executed by a computer, cause the computer to execute the steps of:

defining templates, by a fraud manager with access control as enabled by a fraud manager interface, wherein each template comprises a structure of placeholders to be populated with information specifying at least one action and at least one notification, the information including authorization request message fields, relational operators, values, and logical operators, populating template placeholders, by the fraud manager, with information to generate a template rule, receiving at least one template rule selection, and generating at least one cardholder rule, based on received user input, referring to the at least one selected template and the information populating the template, and specifying an action and a notification, and dynamically retrieving, on a per-transaction basis from the rule database, a cardholder rule associated with a customer from each authorization request, applying the retrieved cardholder rule to the transaction request, executing the cardholder rule with reference to a template rule, implementing the action and notification specified in the template rule, and transmitting the positive and negative authorization outputs.

* * * * *

UNITED STATES PATENT AND TRADEMARK OFFICE
CERTIFICATE OF CORRECTION

PATENT NO. : 8,229,854 B2  
APPLICATION NO. : 12/461289  
DATED : July 24, 2012  
INVENTOR(S) : Kavanagh et al.

Page 1 of 1

It is certified that error appears in the above-identified patent and that said Letters Patent is hereby corrected as shown below:

On the Title Page, Item (12) under United States Patent: change "Stephen et al." to -- Kavanagh et al. --.

On the Title page, Item (75) Inventors: change "Kavanagh Stephen" to -- Stephen Kavanagh --.

Signed and Sealed this
Seventh Day of January, 2014

Margaret A. Focarino
*Commissioner for Patents of the United States Patent and Trademark Office*